US008239947B1

(12) United States Patent
Glick et al.

(10) Patent No.: US 8,239,947 B1
(45) Date of Patent: Aug. 7, 2012

(54) METHOD USING KERNEL MODE ASSISTANCE FOR THE DETECTION AND REMOVAL OF THREATS WHICH ARE ACTIVELY PREVENTING DETECTION AND REMOVAL FROM A RUNNING SYSTEM

(75) Inventors: Adam Glick, Culver City, CA (US); Patrick Gardner, Northridge, CA (US); Pieter Viljoen, Marina Del Rey, CA (US)

(73) Assignee: Symantec Corporation, Mountain View, CA (US)

( * ) Notice: Subject to any disclaimer, the term of this patent is extended or adjusted under 35 U.S.C. 154(b) by 1950 days.

(21) Appl. No.: 11/348,854

(22) Filed: Feb. 6, 2006

(51) Int. Cl.
*H04L 29/06* (2006.01)
(52) U.S. Cl. .......... 726/24; 726/27; 726/30; 713/1; 713/153; 713/165
(58) Field of Classification Search .......... 726/22–26, 726/1–4; 713/1, 150, 152, 188, 189, 153, 713/161–165; 707/1, 3, 100, 200
See application file for complete search history.

(56) References Cited

U.S. PATENT DOCUMENTS

| | | | | |
|---|---|---|---|---|
| 5,826,012 | A * | 10/1998 | Lettvin | 726/22 |
| 2002/0129277 | A1 * | 9/2002 | Caccavale | 713/201 |
| 2004/0168070 | A1 * | 8/2004 | Szor | 713/188 |
| 2005/0149749 | A1 * | 7/2005 | Van Brabant | 713/200 |
| 2006/0026684 | A1 * | 2/2006 | Harvey et al. | 726/23 |
| 2006/0101282 | A1 * | 5/2006 | Costea et al. | 713/188 |
| 2006/0117325 | A1 * | 6/2006 | Wieland et al. | 719/321 |
| 2006/0150256 | A1 * | 7/2006 | Fanton et al. | 726/27 |

OTHER PUBLICATIONS

/Tal Garfinkel/,/Mendel Rosenblum/, "A Virtual Machine Introspection Based Archetecture for Intrusion Detection", 2003.*

* cited by examiner

*Primary Examiner* — Jeffrey Pwu
*Assistant Examiner* — Michael D Anderson
(74) *Attorney, Agent, or Firm* — McKay and Hodgson, LLP; Serge J. Hodgson; Sean P. Lewis

(57) ABSTRACT

A user mode application component invokes the assistance of a kernel mode driver component to detect and/or remediate malicious code on a computer system. The user mode application may include code that detects, for example, spyware and computer viruses, from user mode and when appropriate takes protective action when malicious code is detected. In one aspect, when the user mode application is unable to perform a selected operation in attempting to detect and/or take protective action, the user mode application invokes a kernel mode driver for assistance. The kernel mode driver assists user mode application in detecting malicious code and/or taking protective action by enabling or otherwise performing a selected operation for the user mode application.

2 Claims, 12 Drawing Sheets

METHOD USING KERNEL MODE ASSISTANCE FOR THE DETECTION AND REMOVAL OF THREATS WHICH ARE ACTIVELY PREVENTING DETECTION AND REMOVAL FROM A RUNNING SYSTEM

BACKGROUND OF THE INVENTION

1. Field of the Invention

The present invention relates to computer systems. More particularly, the present invention relates to the protection of computer systems from malicious code.

2. Description of Related Art

Increasingly various forms of malicious code, such as spyware and computer viruses, protect their presence on computer systems using a variety of stealthing and persistence techniques. These techniques actively prevent detection and removal of the malicious code from a running system.

SUMMARY OF THE INVENTION

Embodiments in accordance with the invention include a kernel mode driver that assists user mode component(s), such as a user mode computer security application, in the detection and/or removal of malicious code on a computer system.

Embodiments described herein are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
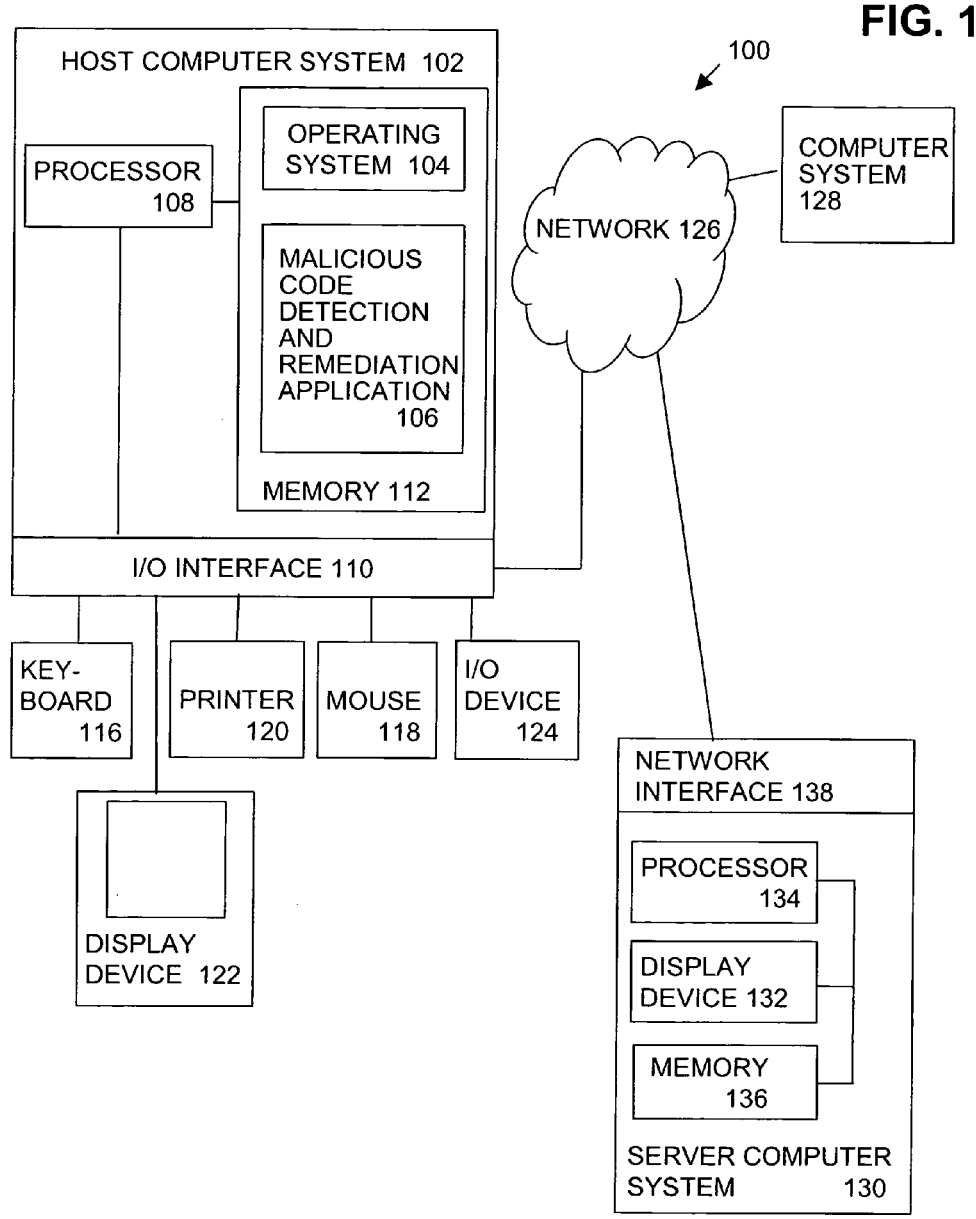
FIG. 1 is a diagram of a client-server system that includes a malicious code detection and remediation application executing on a host computer system in accordance with one embodiment of the invention.

Referring now to FIG. 1, FIG. 1 is a diagram of a client-server system 100 that includes malicious code detection and remediation application 106 executing on a host computer system 102, e.g., a first computer system, in accordance with one embodiment of the invention. Host computer system 102, sometimes called a client or user device, typically includes a central processing unit (CPU) 108, hereinafter processor 108, an input/output (I/O) interface 110, and a memory 112. In one embodiment, memory 112 includes an operating system 104 such as a page-based virtual memory system that uses pages, e.g., memory areas.

For example, Windows 2000 and Windows NT are 32-bit operating systems widely used on home and business computer systems. Windows 2000 and Windows NT provide page-based virtual memory management schemes that permit programs to realize a 4 GB (gigabyte) virtual memory address space. In one embodiment, when processor 108 is running in virtual memory mode, all addresses are presumed virtual addresses and are translated, or mapped, to physical addresses each time processor 108 executes a new instruction to access memory.

Conventionally, the 4 GB virtual memory address space is divided into two parts: a lower 2 GB user address space, also referred to as user mode address space, or ring 3, available for use by a program; and, a high 2 GB system address space, also referred to as kernel address space, or ring 0, reserved for use by the operating system.

To protect the integrity of the operating system code, and other kernel address space code and data structures from errant or malicious programs, and to provide efficient system security (user rights management), Windows 2000 and Windows NT separate code executing in the user address space, e.g., user mode, from code executing in the kernel address space, e.g., kernel mode. User mode code typically does not have direct access to kernel mode code and has restricted access to computer system resources and hardware. To utilize kernel mode code functionalities, user mode programs utilize system calls provided in an application program interface (API), e.g., win32dll and Ntdll, which interface between the user mode and kernel mode functions.

Host computer system 102 may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, malicious code detection and remediation application 106 is loaded into host computer system 102 via I/O device 124, such as from a CD, DVD or floppy disk containing malicious code detection and remediation application 106.

Host computer system 102 is coupled to a server system 130 of client-server system 100 by a network 126. Server system 130 typically includes a display device 132, a processor 134, a memory 136, and a network interface 138.

Further, host computer system 102 is also coupled to a computer system 128, such as an attacker computer system, by network 126 over which information can be sent from malicious code, such as spyware or computer viruses, installed on host computer system 102. In one embodiment, computer system 128 is similar to host computer system 102 and, for example, includes a central processing unit, an input output (I/O) interface, and a memory. Computer system 128 may further include standard devices like a keyboard, a mouse, a printer, a display device and an I/O device(s). The various hardware components of computer system 128 are not illustrated to avoid detracting from the principals of the invention.

Network 126 can be any network or network system that is of interest to a user. In various embodiments, network interface 138 and I/O interface 110 include analog modems, digital modems, or a network interface card.

In one embodiment, malicious code detection and remediation application 106 is typically stored in memory 112 of host computer system 102 and executed on host computer system 102. The particular type and configuration of host computer system 102, computer system 128, and server system 130 are not essential to the present embodiment.

Herein, in one embodiment, malicious code is defined as any computer program, module, set of modules, or code that enters a computer system environment without an authorized user's knowledge and/or without an authorized user's consent. A computer virus is one example of a malicious code. Herein malicious code can exist in either user mode or kernel mode.

Figure 2:
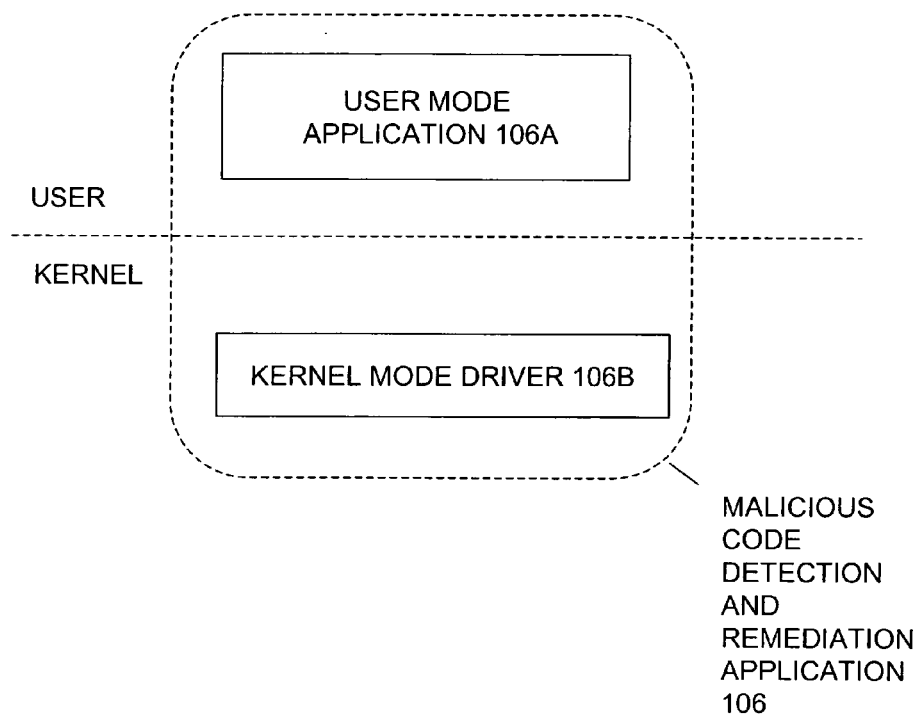
FIG. 2 is a block diagram illustrating a user mode application component and a kernel mode driver component of the malicious code detection and remediation application of FIG. 1 in accordance with one embodiment of the invention.

FIG. 2 is a block diagram illustrating a user mode application component and a kernel mode driver component of malicious code detection and remediation application 106 in accordance with one embodiment of the invention. In one embodiment, malicious code detection and remediation application 106 includes a user mode application 106A and a kernel mode driver 106B. In one embodiment, when malicious code detection and remediation application 106 is installed on a host computer system 102, kernel mode driver 106B is dynamically installed. In some embodiments, a separate installer program is used.

In one embodiment, user mode application 106A includes code that detects malicious code, such as spyware and computer viruses, from user mode and when appropriate takes protective action when malicious code is detected. In the present embodiment, when user mode application 106A is unable to perform a selected operation in attempting to detect and/or take protective action, user mode application 106A invokes kernel mode driver 106B assistance.

Kernel mode driver 106B assists user mode application 106A in detecting malicious code and/or taking protective action by enabling or otherwise performing a selected operation for user mode application 106A, and in some embodiments performs other operations. In some embodiments, kernel mode driver 106B returns information to user mode application 106A, and user mode application 106A utilizes the returned information in performing the selected operation. In some embodiments, kernel mode driver 106B invokes kernel mode functionalities and performs the selected operation. In some embodiments, protective action is taken by user mode application 106A, while in other embodiments protective action is taken by kernel mode driver 106B.

Some malicious codes prevent other applications, such as user mode antivirus (AV) applications, from accessing selected objects, such as files, by overriding selected user mode and/or kernel mode API functions that allow iteration of files or subdirectories in a directory, effectively locking the affected files or subdirectories. For example, some malicious code will prevent iteration of files or subdirectories in a directory by overriding the user mode FindFirstFile( ) and FindNextFile( ) API functions, or by overriding the kernel mode ZwQueryFullAttributesFile( ) or ZwQueryDirectoryFile( ) API functions.

Thus, an AV application attempting to iterate the files or subdirectories, is prevented from enumerating the files or subdirectories, thereby preventing malicious code detection and deletion by the AV application. In one embodiment, kernel mode driver 106B is used to obtain access to locked objects as further described herein with reference to FIG. 3 and method 300.

Figure 3:
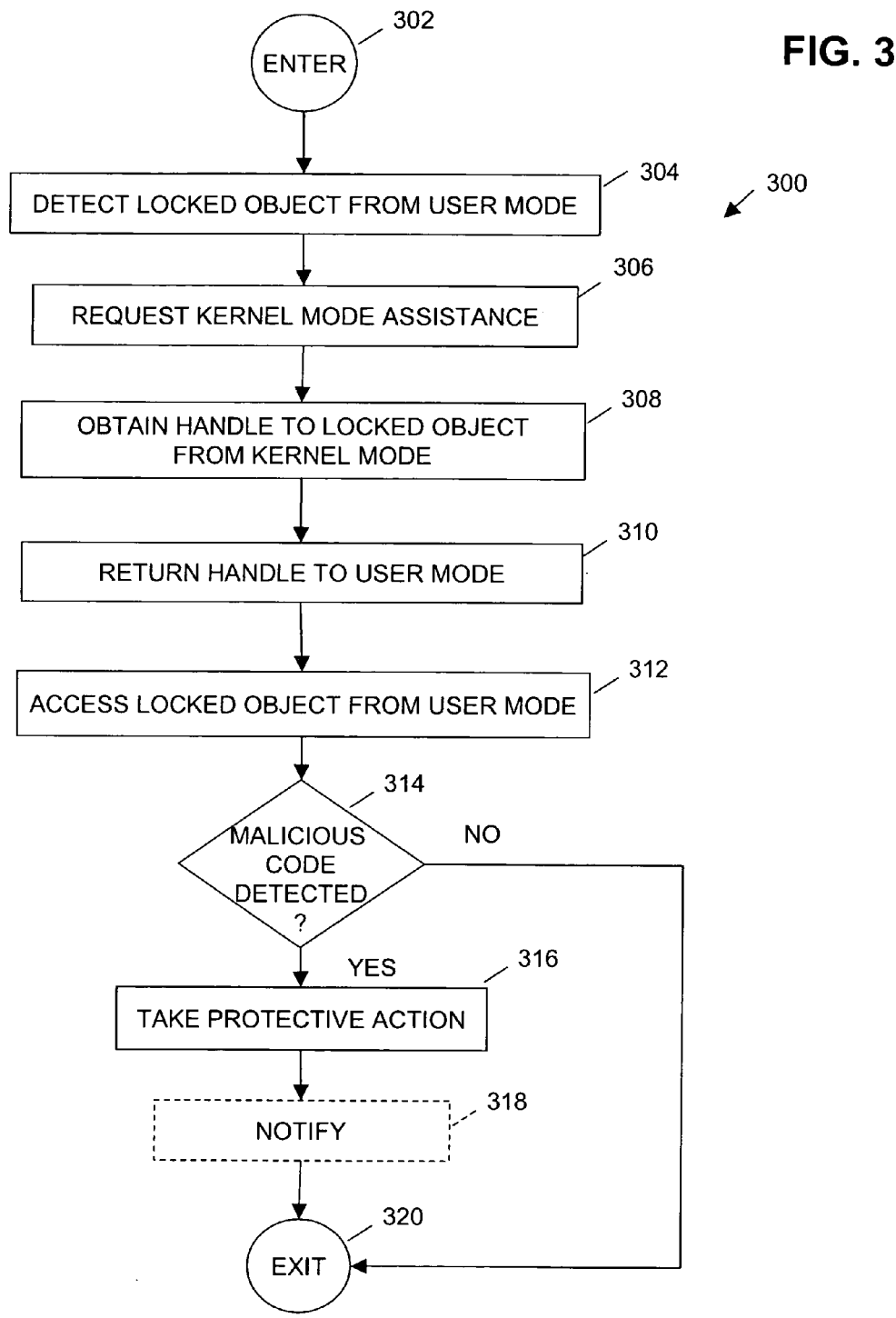
FIG. 3 illustrates a flow diagram of a method for accessing locked objects using kernel mode assistance in accordance with one embodiment of the invention.

FIG. 3 illustrates a flow diagram of a method 300 for accessing locked objects using kernel mode assistance in accordance with one embodiment of the invention. Referring now to FIGS. 1, 2, and 3 together, in one embodiment, execution of malicious code detection and remediation application 106 by processor 108 results in the operations of method 300 as described below.

In the present embodiment, malicious code detection and remediation application 106 is installed on host computer system 102 and includes user mode application 106A that operates from user mode and kernel mode driver 106B that operates from kernel mode. In one embodiment, method 300 is entered at an ENTER operation 302, and from ENTER operation 302, processing transitions to DETECT LOCKED OBJECT FROM USER MODE operation 304.

In DETECT LOCKED OBJECT FROM USER MODE operation 304, user mode application 106A detects a locked object on host computer system 102, such as a locked file. Herein in this embodiment, a locked object is an object that cannot be iterated due to a kernel mode or user mode API function, which allows iteration of files or subdirectories, being overridden by malicious code. For example, user mode application 106A attempts to access a locked object, such as a file, on host computer system 102 and is returned a notification that the resource is locked, e.g., access is denied.

Typically a user mode application opens a file via a system call to a user mode API, such as by using CreateFile( ) in a Windows 2000/NT operating system. The system call is then typically forwarded to a native dll, such as Ntdll, which then performs associated operations to call at the operating system function associated with the CreateFile( ) call. When the file is exclusively locked, the call is failed as the access controls present on the file are checked during the typical calling process. From DETECT LOCKED OBJECT FROM USER MODE operation 304, processing transitions to a REQUEST KERNEL MODE ASSISTANCE operation 306.

In REQUEST KERNEL MODE ASSISTANCE operation 306, in one embodiment, user mode application 106A generates and sends a request to kernel mode driver 106B to assist in accessing the locked object. In one embodiment, user mode application 106A requests kernel mode driver 106B obtain a handle to the locked object, thus bypassing the typically system call route through which access to the locked object is unavailable.

For example, in one embodiment user mode application 106A communicates the request to kernel mode driver 106B utilizing an input and output control (IOCTL) function, such as DeviceIoControl, and kernel mode driver 106B performs the requested operation, e.g., obtain a handle to the locked object. IOCTL functions are well known to those of skill in the art and are not further described to avoid detracting from the principles of the invention. From REQUEST KERNEL MODE ASSISTANCE operation 306, processing transitions to an OBTAIN HANDLE TO LOCKED OBJECT FROM KERNEL MODE operation 308.

In OBTAIN HANDLE TO LOCKED OBJECT FROM KERNEL MODE operation 308, kernel mode driver 106B obtains a handle to the locked object. In one embodiment, kernel mode driver 106B receives the request generated in operation 306 and obtains a handle to the locked object.

In one embodiment, kernel mode driver 106B calls IOCreateFileSpecifyDeviceObjectHint( ) with the parameter IO_IGNORE_SHARE_ACCESS_CHECK. This allows kernel mode driver 106B to open a handle with which to access the locked file. The operating system, e.g., operating system 104, generates and returns the handle to kernel mode driver 106B. From OBTAIN HANDLE TO LOCKED OBJECT FROM KERNEL MODE operation 308, processing transitions to a RETURN HANDLE TO USER MODE operation 310.

In RETURN HANDLE TO USER MODE operation 310, the handle obtained by kernel mode driver 106B in operation 308 is returned to user mode application 106A. From RETURN HANDLE TO USER MODE operation 310, processing transitions to an ACCESS LOCKED OBJECT FROM USER MODE operation 312.

In ACCESS LOCKED OBJECT FROM USER MODE operation 312, the locked object is accessed by user mode application 106A using the returned handle. In one embodiment, user mode application 106A calls at the handle returned in operation 310, and obtains access to the locked file. From ACCESS LOCKED OBJECT FROM USER MODE operation 312, processing transitions to a MALICIOUS CODE DETECTED check operation 314.

In MALICIOUS CODE DETECTED check operation 314, user mode application 106A scans, e.g., iterates through, the locked file and determines whether malicious code is detected in the locked file. User mode application 106A uses one or more of a variety of AV techniques for detecting malicious code in the locked file, such as scanning, and signature matching.

When malicious code is not detected ("NO"), from MALICIOUS CODE DETECTED check operation 314, processing transitions to an EXIT operation 320, with processing exiting method 300, or optionally returns to operation 304 upon detection of a next locked object by user mode application 106A.

Referring again to MALICIOUS CODE DETECTED check operation 314, alternatively, when malicious code is detected ("YES"), from MALICIOUS CODE DETECTED check operation 314, processing transitions to a TAKE PROTECTIVE ACTION operation 316.

In TAKE PROTECTIVE ACTION operation 316, protective action is taken. In some embodiments, the malicious code file is deleted from host computer system 102. In some embodiments, the malicious code file is automatically copied to a text file and sent to a security evaluation center. In one embodiment, the user is prompted for input prior to taking protective action, e.g., the user is asked for permission to take protective action. From TAKE PROTECTIVE ACTION operation 316, processing optionally transitions to a NOTIFY operation 318, or directly to EXIT operation 320, or optionally returns to operation 304 on detection of a next locked object by user mode application 106A.

In optional NOTIFY operation 318, the user of host computer system 102 (FIG. 1), and/or a system administrator of the network, e.g., network 126, are notified of a malicious code detection on host computer system 102. In one embodiment, a record or error message is generated and provided to the user and/or system administrator. In one embodiment, the notification identifies the particular malicious code and/or any protective action taken.

The user and/or administrator are notified using any one of a number of techniques, e.g., by using a pop up window, by generating an e-mail, by writing to a file and/or otherwise by logging the event. Further, in one embodiment, a notification is provided to a security center. From optional NOTIFY operation 318, processing transitions to EXIT operation 320, or optionally returns to operation 304 on detection of a next locked object by user mode application 106A.

Differently, some malicious codes modify security permissions on a computer system to deny operations that could be used to detect or remove the threat. For example, a malicious code can remove the SE_DEBUG privilege from a computer system's administrator account in the registry, so that an AV application is not able to acquire the SE_DEBUG privilege, and is not able to detect and terminate the threat. As another example, some malicious code modifies the access control list on a file so that a computer administrator does not have access to the file.

Figure 4:
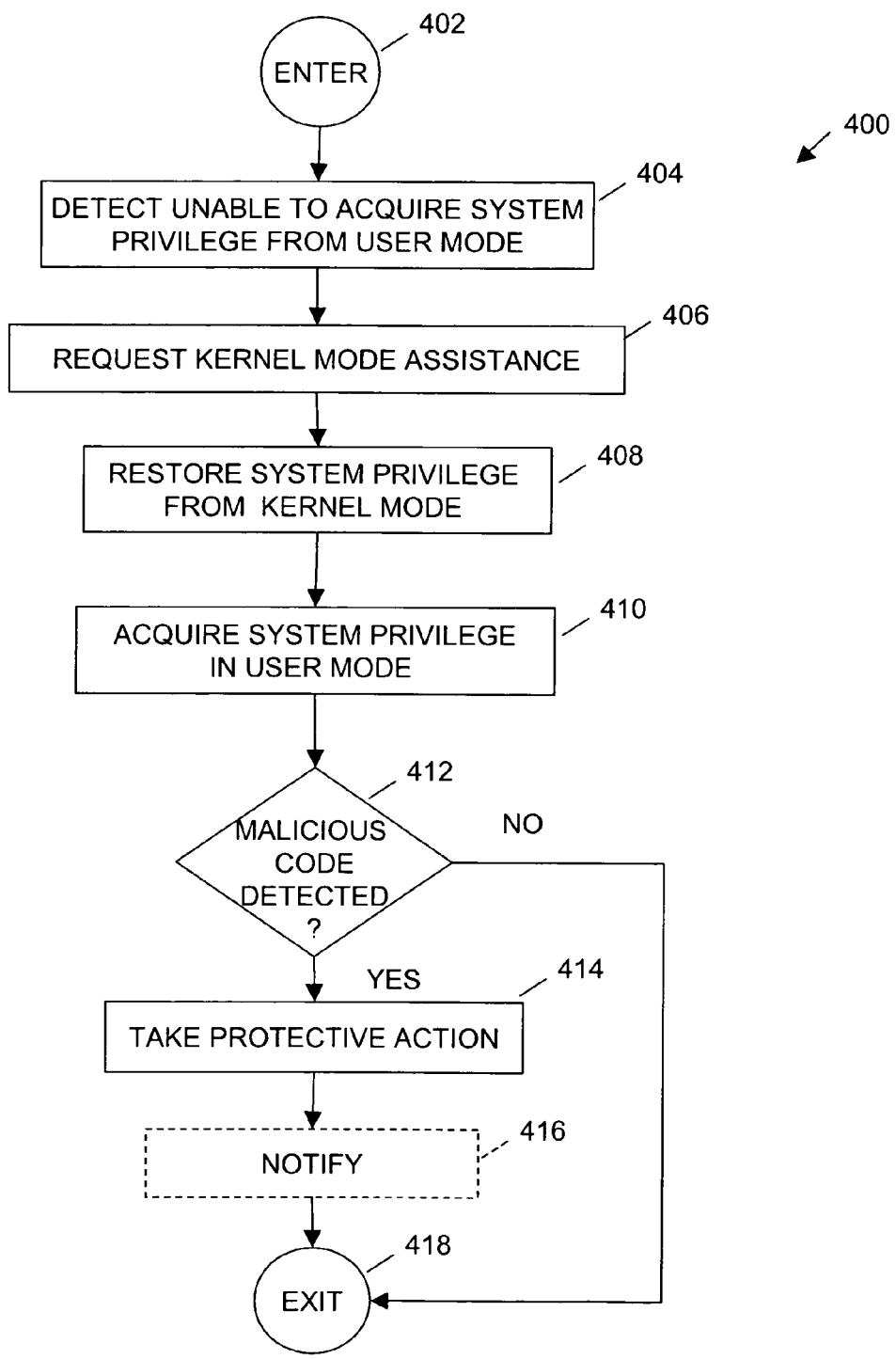
FIG. 4 illustrates a flow diagram of a method for restoring a system privilege using kernel mode assistance in accordance with one embodiment of the invention.

In one embodiment, kernel mode driver 106B is used to restore a system privilege specified by user mode application 106A, and/or to perform an action on behalf of user mode application 106A as further described herein with reference to FIG. 4 and method 400.

FIG. 4 illustrates a flow diagram of a method 400 for restoring a system privilege using kernel mode assistance in accordance with one embodiment of the invention. Referring now to FIGS. 1, 2, and 4 together, in one embodiment, execution of malicious code detection and remediation application 106 by processor 108 results in the operations of method 400 as described below.

In the present embodiment, malicious code detection and remediation application 106 is installed on host computer system 102 and includes user mode application 106A that operates from user mode and kernel mode driver 106B that operates from kernel mode. In the present embodiment, kernel mode driver 106B is loaded prior to all user mode software applications during boot up of host computer system 102. In particular, kernel mode driver 106B is loaded prior to user mode code in the boot process of host computer system 102 to protect privileges being removed by a threat. In one embodiment, method 400 is entered at an ENTER operation 402, and from ENTER operation 402, processing transitions to a DETECT UNABLE TO ACQUIRE SYSTEM PRIVILEGE FROM USER MODE operation 404.

In DETECT UNABLE TO ACQUIRE SYSTEM PRIVILEGE FROM USER MODE operation 404, user mode application 106A detects that it cannot acquire a specific system privilege. For example, in one embodiment, user mode application 106A attempts to acquire the debug privilege of the administrator account on host computer system 102 in order to determine whether malicious code is present in a process running on host computer 102, e.g., to scan a running process. A failure code is returned to user mode application 106A, for example due to removal of the debug privilege from the administrator account by malicious code.

Herein although the examples used herein in discussion of the present embodiment refer to restoration of the debug privilege, those of skill in the art can recognize that the present embodiment is also applicable to restoration of other system privileges, such as restoration of an access control list entry. From DETECT UNABLE TO ACQUIRE SYSTEM PRIVILEGE FROM USER MODE operation 404, processing transitions to a REQUEST KERNEL MODE ASSISTANCE operation 406.

In REQUEST KERNEL MODE ASSISTANCE operation 406, in one embodiment, user mode application 106A generates and sends a request to kernel mode driver 106B to assist in restoring the system privilege. In one embodiment, user mode application 106A requests kernel mode driver 106B restore the system privilege, e.g., the debug privilege, to the administrator account so that user mode application 106A can utilize the system privilege of the administrator account.

For example, in one embodiment user mode application 106A communicates the request to kernel mode driver 106B utilizing an IOCTL function, such as DeviceIoControl, and kernel mode driver 106B performs the requested operation, e.g., restores the system privilege. IOCTL functions are well known to those of skill in the art and are not further described to avoid detracting from the principles of the invention. From REQUEST KERNEL MODE ASSISTANCE operation 406, processing transitions to a RESTORE SYSTEM PRIVILEGE FROM KERNEL MODE operation 408.

In RESTORE SYSTEM PRIVILEGE FROM KERNEL MODE operation 408, one or more system privileges are restored from kernel mode. In one embodiment, kernel mode driver 106B receives the request to restore the one or more required system privileges and restores the one or more required system privileges.

For example, in one embodiment, kernel mode driver 106B restores the debug privilege to the administrator account. In one embodiment, kernel mode driver 106B locates the system privileges in the key descriptor table of the registry and resets the privilege flag to allow user mode application 106A to use the debug privilege of the administrator account.

In one embodiment, kernel mode driver 106B returns a success code to user mode application 106A notifying user mode application 106A that the system privilege was restored. In instances where kernel mode driver 106B cannot restore the system privilege, in one embodiment, kernel mode driver 106B returns a failure code to user mode application 106A notifying user mode application 106A that the system privilege was not restored. From RESTORE SYSTEM PRIVILEGE FROM KERNEL MODE operation 408, processing transitions to an ACQUIRE SYSTEM PRIVILEGE FROM USER MODE operation 410.

In ACQUIRE SYSTEM PRIVILEGE FROM USER MODE operation 410, user mode application 106A acquires the system privilege and accesses the object. For example, in one embodiment, user mode application 106A receives a success code returned from kernel mode driver 106B indicated that system privilege, e.g., the debug privilege, is restored. User mode application 106A then acquires the system privilege, e.g., the debug privilege, by initiating access to the object.

In instances where a failure code is returned to user mode application 106A, processing transitions to an EXIT operation 418 with processing exiting method 400. In some embodiments, an optional notification is provided to the user indicating that a system privilege cannot be acquired and/or an object is inaccessible. From ACQUIRE SYSTEM PRIVILEGE FROM USER MODE operation 410, processing transitions to a MALICIOUS CODE DETECTED check operation 412.

In MALICIOUS CODE DETECTED check operation 412, user mode application 106A scans, e.g., iterates through, an object, such as a running process, accessed using the restored privilege, for example, the debug privilege, and determines whether malicious code is detected in the object. User mode application 106A uses one or more of a variety of AV techniques for detecting malicious code in the object, such as scanning and signature matching.

When malicious code is not detected ("NO"), from MALICIOUS CODE DETECTED check operation 412, processing transitions to an EXIT operation 418, with processing exiting method 400, or optionally returns to operation 404 on detection that a system privilege cannot be acquired by user mode application 106A.

Referring again to MALICIOUS CODE DETECTED check operation 412, alternatively, when malicious code is detected ("YES"), from MALICIOUS CODE DETECTED check operation 412, processing transitions to a TAKE PROTECTIVE ACTION operation 414.

In TAKE PROTECTIVE ACTION operation 414, protective action is taken. In some embodiments, the malicious code file is deleted from host computer system 102. In some embodiments, the malicious code file is automatically copied to a text file and sent to a security evaluation center. In one embodiment, the user is prompted for input prior to taking protective action, e.g., the user is asked for permission to take protective action. From TAKE PROTECTIVE ACTION operation 414, processing optionally transitions to a NOTIFY operation 416, or directly to EXIT operation 418, or optionally returns to operation 404 on a detection that a privilege cannot be acquired by user mode application 106A.

In optional NOTIFY operation 416, the user of host computer system 102 (FIG. 1), and/or a system administrator of the network, e.g., network 126, are notified of a malicious code detection on host computer system 102. In one embodiment, a record or error message is generated and provided to the user and/or system administrator. In one embodiment, the notification identifies the particular malicious code and/or any protective action taken.

The user and/or administrator are notified using any one of a number of techniques, e.g., by using a pop up window, by generating an e-mail, by writing to a file and/or otherwise by logging the event. Further, in one embodiment, a notification is provided to a security center. From optional NOTIFY operation 416, processing transitions to EXIT operation 418, or optionally returns to operation 404 on detection that a privilege cannot be acquired by user mode application 106A.

Differently from modifying or removing system privileges, such as the debug privilege, to prevent detection and removal, some malicious codes utilize techniques to prevent their processes from being terminated. For example, some malicious codes create two processes that attach to each other as debuggers. As only one debugger can be attached a process at a time, the two processes prevent any other process from attaching to them. Another process, such as an AV application, cannot attach to either of the processes, thus the AV application is prevented from terminating malicious code in either of the processes from user mode.

Figure 5:
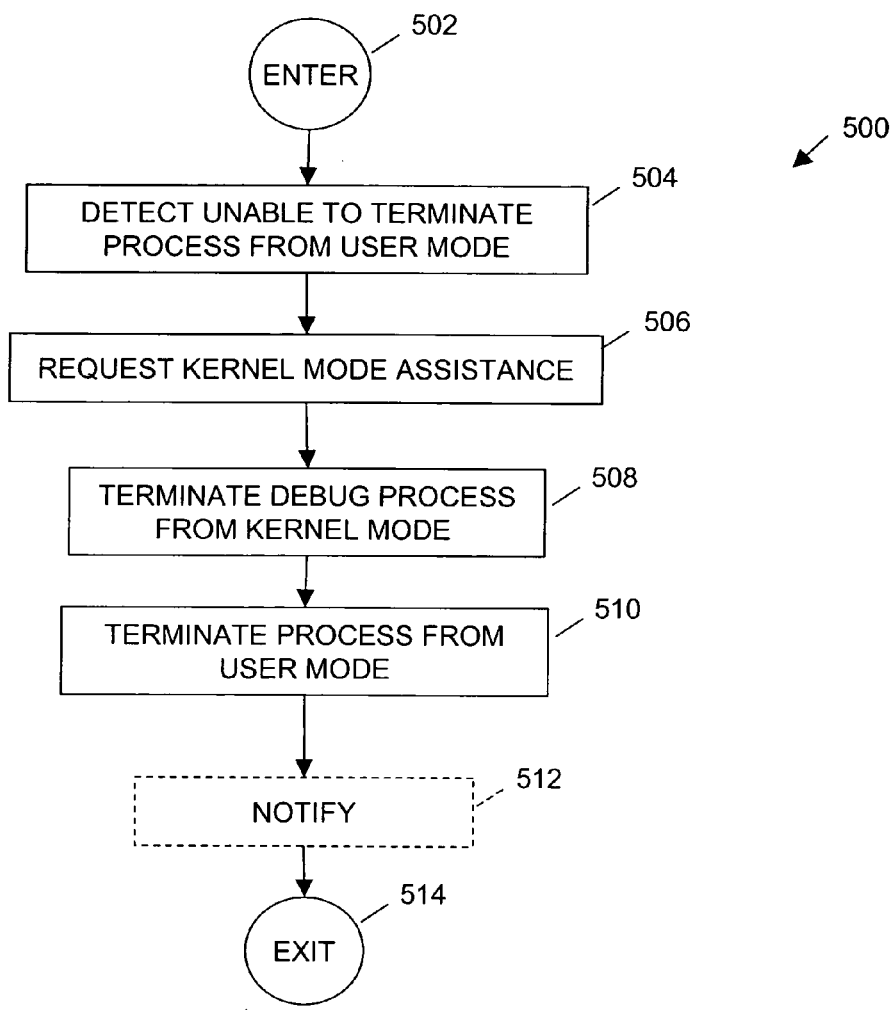
FIG. 5 illustrates a flow diagram of a method for gaining access to processes that prevent access by attaching to each other as debuggers using kernel mode assistance in accordance with one embodiment of the invention.

In one embodiment, kernel mode driver 106B is used to terminate the first and/or second processes that are attached to each other as debuggers as further described herein with reference to FIG. 5 and method 500.

FIG. 5 illustrates a flow diagram of a method 500 for terminating processes that are attached to each other as debuggers using kernel mode assistance in accordance with one embodiment of the invention. Referring now to FIGS. 1, 2, and 5 together, in one embodiment, execution of malicious code detection and remediation application 106 by processor 108 results in the operations of method 500 as described below.

In the present embodiment, malicious code detection and remediation application 106 is installed on host computer system 102 and includes user mode application 106A that operates from user mode and kernel mode driver 106B that operates from kernel mode. In one embodiment, method 500 is entered at an ENTER operation 502, and from ENTER operation 502, processing transitions to a DETECT UNABLE TO TERMINATE PROCESS FROM USER MODE operation 504.

In DETECT UNABLE TO TERMINATE PROCESS FROM USER MODE operation 504, user mode application 106A detects that it cannot terminate a running process from user mode. For example, in one embodiment, user mode application 106A detects malicious code in a running process, e.g., a first process, on host computer system 102 and attempts to terminate the running process, e.g., the first process.

A failure code is returned to user mode application 106A, for example, because another malicious code process, e.g., a second process, is attached to the first process as a debugger. From DETECT UNABLE TO TERMINATE PROCESS FROM USER MODE operation 504, processing transitions to a REQUEST KERNEL MODE ASSISTANCE operation 506.

In REQUEST KERNEL MODE ASSISTANCE operation 506, in one embodiment, user mode application 106A generates and sends a request to kernel mode driver 106B to assist in terminating the process to which termination was denied, i.e., the first process. In one embodiment, user mode application 106A requests kernel mode driver 106B terminate the second process and break the dual debugger attachment to the first process.

For example, in one embodiment user mode application 106A communicates the request to kernel mode driver 106B utilizing an input and output control (IOCTL) function, such as DeviceIoControl. IOCTL functions are well known to those of skill in the art and are not further described to avoid detracting from the principles of the invention. From REQUEST KERNEL MODE ASSISTANCE operation 506, processing transitions to a TERMINATE DEBUG PROCESS FROM KERNEL MODE operation 508.

In TERMINATE DEBUG PROCESS FROM KERNEL MODE operation 508, kernel mode driver 106B terminates the debugging process attachment of the second process to the first process allowing termination of the other process, i.e., the first process. In one embodiment kernel mode driver 106B performs the operation defined by the IOCTL function, e.g., terminates the debugging process. When the debugging process to the first process is terminated, user mode application 106A can terminate the first process, as the first process and the second process are no longer dually attached to each other as debuggers. From TERMINATE DEBUG PROCESS FROM KERNEL MODE operation 508, processing transitions to a TERMINATE PROCESS FROM USER MODE operation 510.

In TERMINATE PROCESS FROM USER MODE operation 510, user mode application 106A terminates the process of which termination was earlier denied, e.g., terminates the first process. In one embodiment, kernel mode driver 106B communicates the termination of the second process to user mode application 106A and/or instructs user mode application 106A to terminate the first process. User mode application 106A terminates the first process. From TERMINATE PROCESS FROM USER MODE operation 510, processing transitions to a an optional NOTIFY operation 512, or directly to an EXIT operation 514 with processing exiting method 500, or optionally returns to operation 504 on detection of a next process inaccessible by user mode application 106A.

In optional NOTIFY operation 512, the user of host computer system 102 (FIG. 1), and/or a system administrator of the network, e.g., network 126, are notified of a malicious code termination on host computer system 102. In one embodiment, a record or error message is generated and provided to the user and/or system administrator. In one embodiment, the notification identifies the particular malicious code.

The user and/or administrator are notified using any one of a number of techniques, e.g., by using a pop up window, by generating an e-mail, by writing to a file and/or otherwise by logging the event. Further, in one embodiment, a notification is provided to a security center. From optional NOTIFY operation 512, processing transitions to EXIT operation 514, or optionally returns to operation 504 on detection of a next process that cannot be terminated by user mode application 106A.

As earlier described, typically user mode applications cannot directly access operating system functions in the kernel. Rather, user mode applications access operating system functions through a user mode application program interface (API), such as win32dll or Ntdll. The user mode application calls a specified user mode system call which implements associated code. The associated code typically calls a native API function that accesses an associated operating system function from kernel mode.

Some malicious codes hook user mode APIs and subsequently mask the presence of the malicious code. For example, some malicious codes hook the PS (process status) API that is used to iterate all running processes on a computer system, such as the EnumProcesses( ) APIs. The malicious code modifies information returned as a result of a call through the hooked PS API so that processes listed in the information returned through the PS API and associated with the malicious code are removed or otherwise hidden on return to the caller.

User mode AV applications that utilize standard API calls that have been hooked by malicious code as described above are returned false information. In this way a malicious code hides its presence from file system searches, and in particular from file system searches performed by user mode AV applications.

Figure 6:
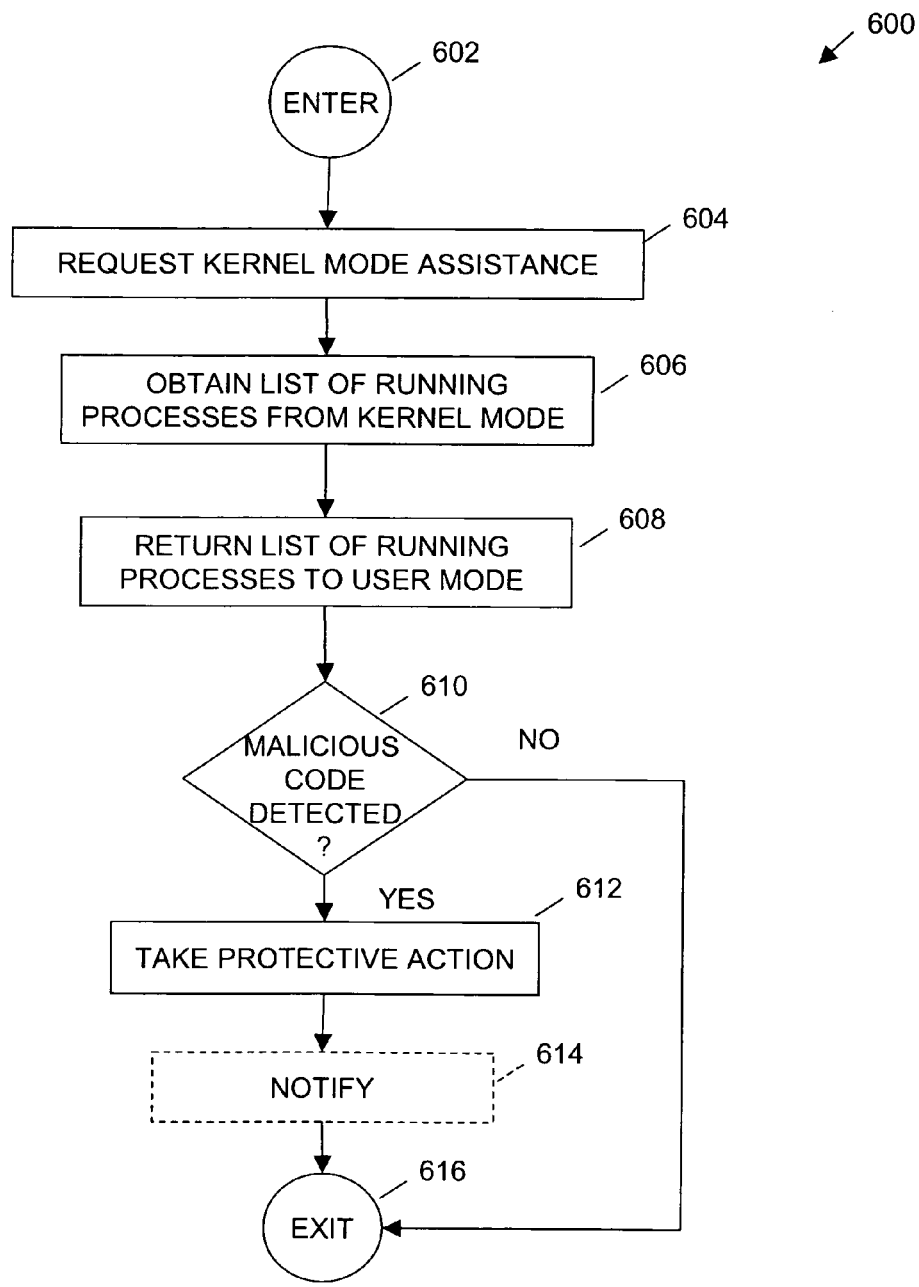
FIG. 6 illustrates a flow diagram of a method for detecting malicious code using kernel mode assistance in accordance with one embodiment of the invention.

In one embodiment, rather than user mode application 106A accessing operating system functions through standard user mode APIs, which can be hooked by malicious code, user mode application 106A accesses operating system functions through kernel mode driver 106B and bypasses standard user mode APIs as further described herein with reference to FIG. 6 and method 600.

FIG. 6 illustrates a flow diagram of a method 600 for detecting malicious code using kernel mode assistance in accordance with one embodiment of the invention. Referring now to FIGS. 1, 2, and 6 together, in one embodiment, execution of malicious code detection and remediation application 106 by processor 108 results in the operations of method 600 as described below.

In the present embodiment, malicious code detection and remediation application 106 is installed on host computer system 102 and includes user mode application 106A that operates from user mode and kernel mode driver 106B that operates from kernel mode. In one embodiment, method 600 is entered at an ENTER operation 602, and from ENTER operation 602, processing transitions to a REQUEST KERNEL MODE ASSISTANCE operation 604.

In REQUEST KERNEL MODE ASSISTANCE operation 604, in one embodiment, user mode application 106A generates and sends a request to kernel mode driver 106B to return a list of all running processes on host computer system 102 and/or all dlls loaded into each running process. For example, in one embodiment user mode application 106A communicates the request to kernel mode driver 106B utilizing an input and output control (IOCTL) function, such as DeviceIoControl. IOCTL functions are well known to those of skill in the art and are not further described to avoid detracting from the principles of the invention. From REQUEST KERNEL MODE ASSISTANCE operation 604, processing transitions to an OBTAIN LIST OF RUNNING PROCESSES FROM KERNEL MODE operation 606.

In OBTAIN LIST OF RUNNING PROCESSES FROM KERNEL MODE operation 606, kernel mode driver 106B receives the request from user mode application 106A and a list of running processes and/or dlls loaded into each running process is obtained by kernel mode driver 106B. In one embodiment, kernel mode driver 106B receives the request to obtain a list of running processes and/or all dlls loaded into each running process, and obtains the list of running processes and/or dlls loaded into each running process on host computer system 102.

For example, in one embodiment, kernel mode driver 106B calls a kernel mode native API function, such as ZwQuerySystemInformation( ). The call to ZwQuerySystemInformation( ) is communicated to the associated operating system function that obtains the list of all running processes on host computer system 102 and returns the list to kernel mode driver 106B. From OBTAIN LIST OF RUNNING PROCESSES FROM KERNEL MODE operation 606, processing transitions to a RETURN LIST OF RUNNING PROCESSES TO USER MODE operation 608.

In RETURN LIST OF RUNNING PROCESSES TO USER MODE operation 608, kernel mode driver 106B returns the list of running processes and/or dlls loaded into each running process obtained in operation 606 to user mode application 106A. From RETURN LIST OF RUNNING PROCESSES TO USER MODE operation 608, processing transitions to a MALICIOUS CODE DETECTED check operation 610.

In MALICIOUS CODE DETECTED check operation 610, user mode application 106A evaluates the list of running processes and/or dlls loaded into each running process returned in operation 608 and determines whether malicious code is detected on host computer system 102. User mode application 106A uses one or more of a variety of AV techniques for detecting malicious code in the list, such as scanning identified processes and signature matching. In this way user mode application 106A performs the evaluation on information returned from kernel mode driver 106B and circumvents the use of user mode APIs and the attendant risk of false information provided by malicious code that has hooked the user mode APIs.

When malicious code is not detected ("NO"), from MALICIOUS CODE DETECTED check operation 610, processing transitions to an EXIT operation 616, with processing exiting method 600, or optionally returns to operation 604.

Referring again to MALICIOUS CODE DETECTED check operation 610, alternatively, when malicious code is detected ("YES"), from MALICIOUS CODE DETECTED check operation 610, processing transitions to a TAKE PROTECTIVE ACTION operation 612.

In TAKE PROTECTIVE ACTION operation 612 protective action is taken. In some embodiments, the malicious code file is deleted from host computer system 102. In some embodiments, the malicious code file is automatically copied to a text file and sent to a security evaluation center. In one embodiment, the user is prompted for input prior to taking protective action, e.g., the user is asked for permission to take protective action. From TAKE PROTECTIVE ACTION operation 612, processing optionally transitions to a NOTIFY operation 614, or directly to EXIT operation 616, or optionally returns to operation 604.

In optional NOTIFY operation 614, the user of host computer system 102 (FIG. 1), and/or a system administrator of the network, e.g., network 126, are notified of a malicious code detection on host computer system 102. In one embodiment, a record or error message is generated and provided to the user and/or system administrator. In one embodiment, the notification identifies the particular malicious code and/or any protective action taken.

The user and/or administrator are notified using any one of a number of techniques, e.g., by using a pop up window, by generating an e-mail, by writing to a file and/or otherwise by logging the event. Further, in one embodiment, a notification is provided to a security center. From optional NOTIFY operation 614, processing transitions to EXIT operation 616, or optionally returns to operation 604.

Differently, some malicious codes attempt to entrench themselves in a computer system and prevent themselves from being removed by attaching to a critical process. For example, some malicious codes inject themselves into critical operating system processes and cannot be deleted while the critical operating system process is running as terminating the critical operating system process will destabilize the computer system. Thus the malicious code effectively prevents itself from being deleted while the process is running.

As a user mode AV application that detects the malicious code cannot terminate the critical process without destabilizing the computer system, some AV applications wait to delete the malicious code files from the computer system on reboot of the computer system. For example, in Windows NT/2000 an AV application can use the MoveFileEx( ) with the MOVEFILE_DELAY_UNTIL_REBOOT flag (and destination value set to null) to delete files and directories currently being used. The next time the system is rebooted, the boot operation deletes the specified files and directories. Typically the operating system stores the location of the specified files in the registry, for example, in the HKEY_LOCAL_MACHINE\SYSTEM\CurrentControlSet\Control\Session Manager\PendingFileRenameOperations registry key.

However, some malicious code monitor the registry and/or the invocation of commands that mark them for deletion and can remove themselves from the registry when they are listed for deletion on reboot. Thus, although detected and listed for deletion by an AV application, some malicious codes actively prevent their deletion.

Figure 7:
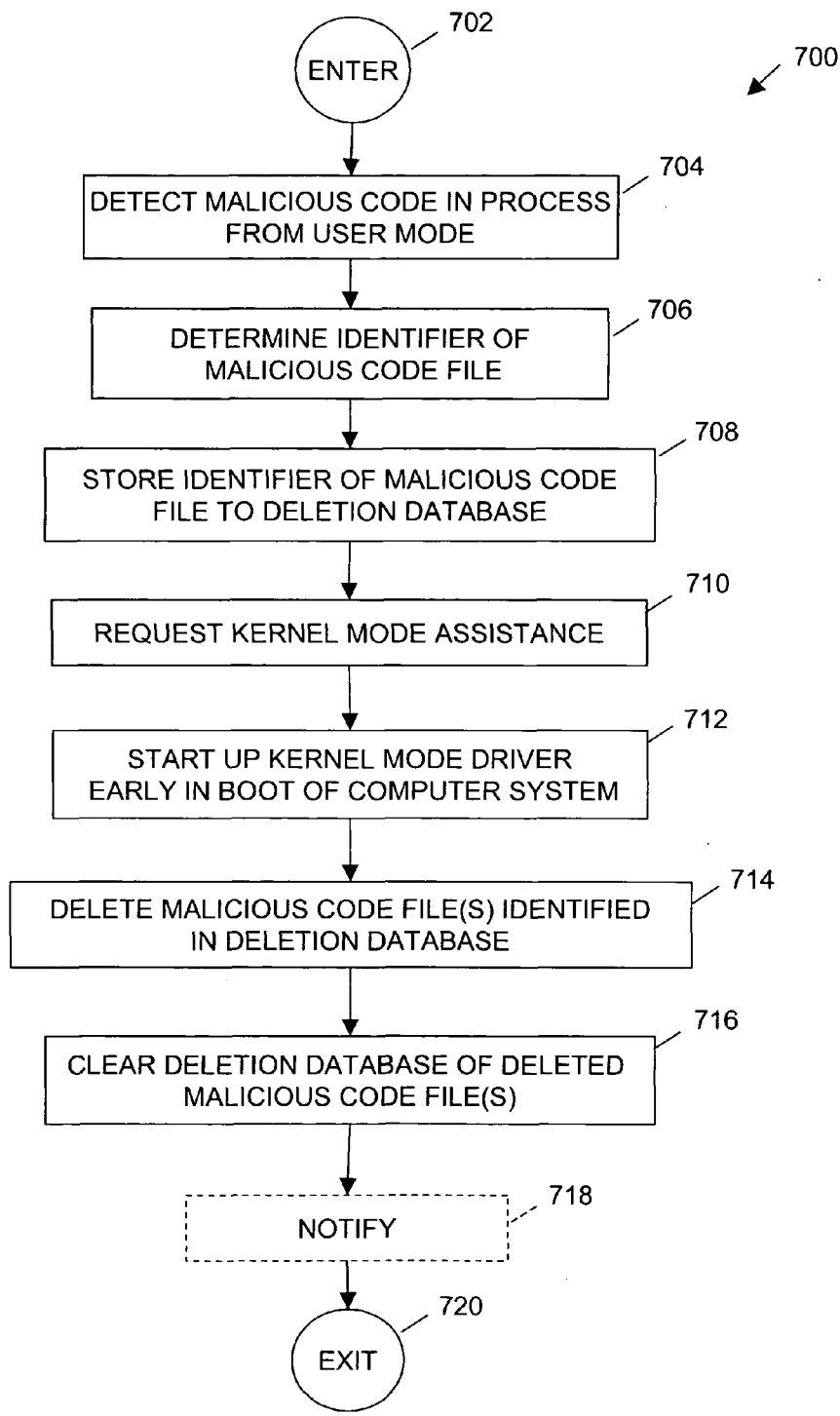
FIG. 7 illustrates a flow diagram of a method for preventing removal of malicious code files marked for deletion on reboot from a registry using kernel mode assistance in accordance with one embodiment of the invention.

In one embodiment, kernel mode driver 106B monitors the registry on the host computer system and prevents changes to the registry that prevent a listed file from being deleted on reboot as further described herein with reference to FIG. 7 and method 700.

FIG. 7 illustrates a flow diagram of a method 700 for preventing removal of malicious code files marked for deletion on reboot from a registry using kernel mode assistance in accordance with one embodiment of the invention. Referring now to FIGS. 1, 2, and 7 together, in one embodiment, execution of malicious code detection and remediation application 106 by processor 108 results in the operations of method 700 as described below.

In the present embodiment, malicious code detection and remediation application 106 is installed on host computer system 102 and includes user mode application 106A that operates from user mode and kernel mode driver 106B that operates from kernel mode. In one embodiment, method 700 is entered at an ENTER operation 702, and from ENTER operation 702, processing transitions to a DETECT MALICIOUS CODE IN PROCESS FROM USER MODE operation 704.

In DETECT MALICIOUS CODE IN PROCESS FROM USER MODE operation 704, user mode application 106A detects malicious code in a running process. For example, in one embodiment, user mode application 106A detects malicious code in a process running on host computer system 102, such as by scanning the process. From DETECT MALICIOUS CODE IN PROCESS FROM USER MODE operation 704, processing transitions to a DETERMINE IDENTIFIER OF MALICIOUS CODE FILE operation 706.

In DETERMINE IDENTIFIER OF MALICIOUS CODE FILE operation 706, user mode application 106A determines an identifier of the detected malicious code. For example, in one embodiment, the identifier is the file name and/or address of the running process. In one embodiment, the identifier includes information that operating system 104 utilizes to locate and delete the malicious code file(s) from host computer system 102. From DETERMINE IDENTIFIER OF MALICIOUS CODE FILE operation 706, processing transitions to a STORE IDENTIFIER OF MALICIOUS CODE FILE TO DELETION DATABASE operation 708.

In STORE IDENTIFIER OF MALICIOUS CODE FILE TO DELETION DATABASE operation 708, the identifier of the malicious code file identified in operation 706 is stored off, such as to a file or other data storage structure in memory. In one embodiment, the identifier of the malicious code file is stored in a deletion database maintained by malicious code detection and remediation application 106. In this way, the deletion database maintains a listing of malicious code files for deletion on reboot separate from the registry. From STORE IDENTIFIER OF MALICIOUS CODE FILE TO DELETION DATABASE operation 708, processing transitions to a REQUEST KERNEL MODE ASSISTANCE operation 710.

In REQUEST KERNEL MODE ASSISTANCE operation 710, in one embodiment, user mode application 106A generates and sends a request to kernel mode driver 106B to prevent the malicious code from removing its files from the registry, and in particular from the portion of the registry key listing the malicious code file for deletion on reboot. In one embodiment, user mode application 106A requests that kernel mode driver 106B start up early in the next boot operation of host computer system 102 and delete the malicious code file(s) identified in the deletion database from host computer system 102.

In this way, even if malicious code has removed itself from the portion of the registry that identifies files to be deleted on reboot, kernel mode driver 106B, starts up before any user applications in the boot process and removes the malicious code files from host computer system 102 based upon the listing in the deletion database. From REQUEST KERNEL MODE ASSISTANCE operation 710, processing transitions to a START UP KERNEL MODE DRIVER EARLY IN BOOT OF COMPUTER SYSTEM operation 712.

In START UP KERNEL MODE DRIVER EARLY IN BOOT OF COMPUTER SYSTEM operation 712, kernel mode driver 106B starts up early in the boot operation of host computer system 102. In one embodiment, kernel mode driver 106B receives the request from user mode application 106A generated in operation 710 and initiates operations to ensure it is loaded early in the next boot of host computer system 102 and prior to user applications.

A wide variety of techniques can be used to set kernel mode driver 106B for early start up in the next boot of host computer system 102. For example, kernel mode driver 106B adjusts registry settings and/or lists itself in the registry for early run or prefetch. Early start up of a driver in a boot operation of a host computer system is well known to those of skill in the art and is not further described herein to avoid detracting from the principles of the invention. From START UP KERNEL MODE DRIVER EARLY IN BOOT OF COMPUTER SYSTEM operation 712, processing transitions to a DELETE MALICIOUS CODE FILE(S) IDENTIFIED IN DELETION DATABASE operation 714.

In DELETE MALICIOUS CODE FILE(S) IDENTIFIED IN DELETION DATABASE operation 714, kernel mode driver 106B deletes the files identified in the deletion database from host computer system 102B. For example, in one embodiment, kernel mode driver 106B generates a call to ZwDeleteFile( ) identifying the malicious code file(s) to be deleted using the malicious code identifier as a parameter of the call.

In one embodiment, kernel mode driver 106B iterates through the deletion database deleting the identified malicious code files until all the identified malicious code files are deleted from host computer system 102. From DELETE MALICIOUS CODE FILE(S) IDENTIFIED IN DELETION DATABASE operation 714, processing transitions to a CLEAR DELETION DATABASE OF DELETED MALICIOUS CODE FILE(S) operation 716.

In CLEAR DELETION DATABASE OF DELETED MALICIOUS CODE FILE(S) operation 716, each identifier of a malicious code file that was successfully deleted from host computer system 102 in operation 714 is removed from the deletion database. For example, in one embodiment, each malicious code file is iteratively removed from the deletion database as it is deleted from host computer system 102. In another example, all malicious code files are removed from the deletion database upon deletion of all the listed malicious code files from host computer system 102. From CLEAR DELETION DATABASE OF DELETED MALICIOUS CODE FILE(S) operation 716, processing optionally transitions to a NOTIFY operation 718 or directly to an EXIT operation 720, if operation 718 is not performed, with processing exiting method 700, or optionally returns to operation 704 upon detection of a next malicious code.

In optional NOTIFY operation 718, the user of host computer system 102 (FIG. 1), and/or a system administrator of the network, e.g., network 126, are notified of a malicious code detection and/or deletion on host computer system 102. In one embodiment, a record or error message is generated and provided to the user and/or system administrator. In one embodiment, the notification identifies the particular malicious code and/or any protective action taken.

The user and/or administrator are notified using any one of a number of techniques, e.g., by using a pop up window, by generating an e-mail, by writing to a file and/or otherwise by logging the event. Further, in one embodiment, a notification is provided to a security center. From optional NOTIFY operation 718, processing transitions to EXIT operation 720, or optionally returns to operation 704 on detection of a next malicious code.

Figure 8:
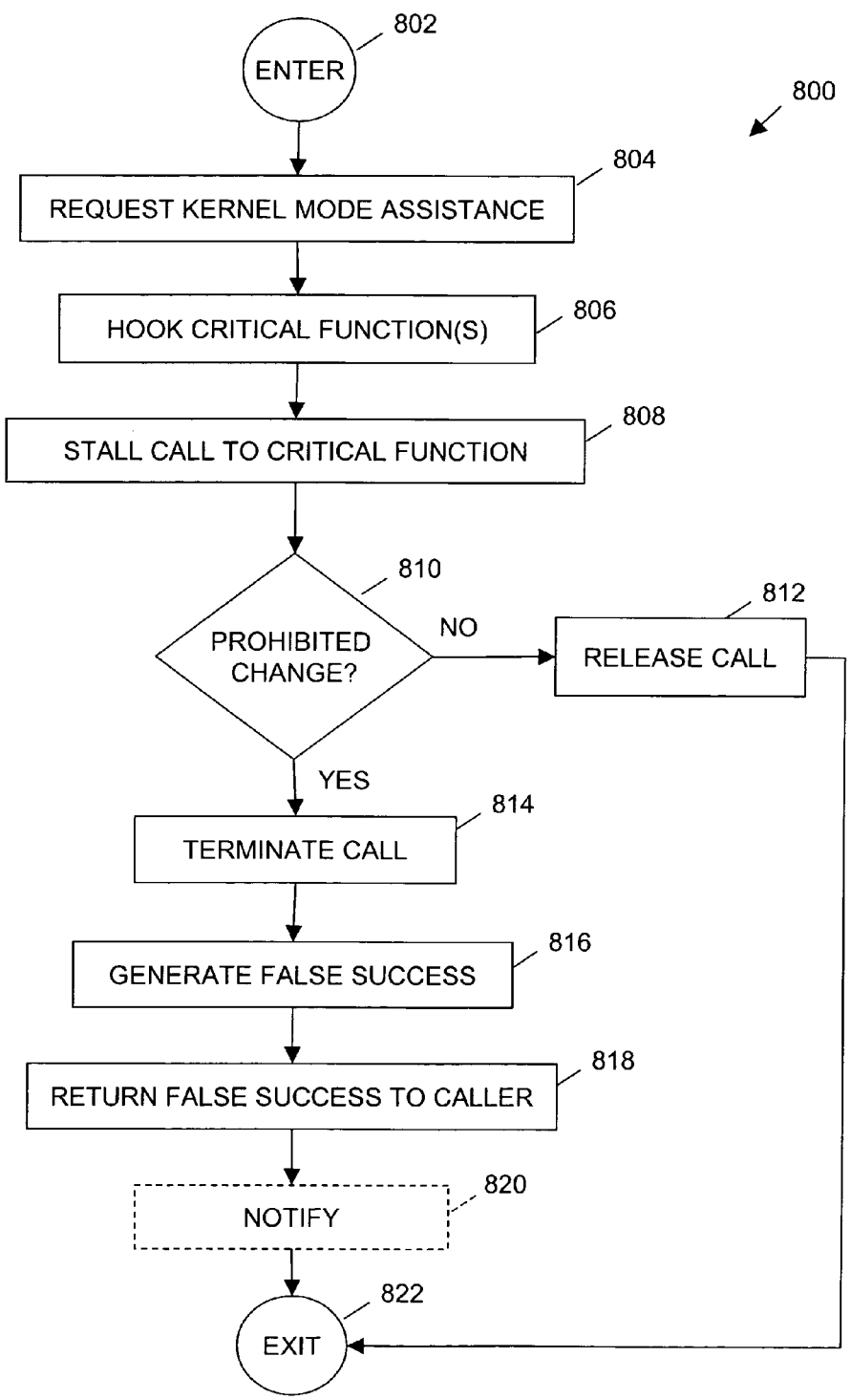
FIG. 8 illustrates a flow diagram of a method for preventing removal of malicious code files from a registry using kernel mode assistance in accordance with another embodiment of the invention.

In an alternative embodiment, kernel mode driver 106B prevents modifications to the registry that prevent a malicious code file from being deleted from host computer system 102 and further returns a false success to the calling process to pacify the initiating malicious code and circumvent possible retaliatory actions as further described herein with reference to FIG. 8 and method 800.

FIG. 8 illustrates a flow diagram of a method 800 for preventing removal of malicious code files from a registry using kernel mode assistance in accordance with another embodiment of the invention. Referring now to FIGS. 1, 2, and 8 together, in one embodiment, execution of malicious code detection and remediation application 106 by processor 108 results in the operations of method 800 as described below.

In the present embodiment, malicious code detection and remediation application 106 is installed on host computer system 102 and includes user mode application 106A that operates from user mode and kernel mode driver 106B that operates from kernel mode. In one embodiment, method 800 is entered at an ENTER operation 802, and from ENTER operation 802, processing transitions to a REQUEST KERNEL MODE ASSISTANCE operation 804.

In REQUEST KERNEL MODE ASSISTANCE operation 804, in one embodiment, user mode application 106A generates and sends a request to kernel mode driver 106B to prevent prohibited changes to critical structures such as the registry, selected files, selected processes, and/or synchronization objects. For example, in one embodiment user mode application 106A communicates the request to kernel mode driver 106B utilizing an input and output control (IOCTL) function, such as DeviceIoControl. IOCTL functions are well known to those of skill in the art and are not further described to avoid detracting from the principles of the invention. From REQUEST KERNEL MODE ASSISTANCE operation 804, processing transitions to a HOOK CRITICAL FUNCTION(S) operation 806.

In HOOK CRITICAL FUNCTION(S) operation 806, kernel mode driver 106B hooks one or more critical functions on host computer system 102. Herein, in one embodiment, a critical function is an operating system function that modifies a registry, file, process, or synchronization object on a host computer system, e.g., host computer system 102.

In one embodiment, kernel mode driver 106B hooks one or more critical functions in a dll or system call table such that calls to the one or more critical functions are redirected to kernel mode driver 106B. Examples of critical functions include those operating system functions callable using RegOpenKey( ) RegOpenKeyEx( ), RegCloseKey( ), and RegSetValue( ).

Other examples of critical functions include those operating system functions callable using NtDeleteKey( ), NtDeleteValueKey( ), NtEnumerateKey( ), NtEnumerateValueKey( ), NtOpenKey( ), NtQueryKey( ), NtQueryValueKey( ), NtSetValueKey( ), NtSaveKey( ), ZwDeleteValueKey( ), ZwEnumerateKey( ), ZwEnumerateValueKey( ), ZwOpenKey( ), ZwQueryKey( ), ZwQueryValueKey( ), ZwSetValueKey( ), ZwSaveKey( ), and ZwRestoreKey( ). Hooking of critical functions can be performed utilizing a variety of hooking techniques.

For example, in one embodiment, a service descriptor table entry associated with the RegOpenKey( ) in a service descriptor table, e.g., the win32dll service descriptor table, is modified so that a call to the associated operating system function, e.g., the RegOpenKey( ) function, is redirected to alternate code, such as a hook module of kernel mode driver 106B. In one embodiment, a function pointer in the service descriptor table entry is modified to point to the hook module rather than the RegOpenKey( ) function.

In an alternate embodiment, a separate hooking component, such as the SymEvent driver (available from Symantec Corporation, California) intercepts calls to critical functions on host computer system 102 and forwards the intercepted calls to kernel mode application 106B. From HOOK CRITICAL FUNCTION(S) operation 806, processing transitions to a STALL CALL TO CRITICAL FUNCTION operation 808.

In STALL CALL TO CRITICAL FUNCTION operation 808, a call to a critical function is received by kernel mode driver 106B and stalled. More particularly, a call to a critical function is redirected to a hook module of kernel mode driver 106B, the call is stalled at kernel mode driver 106B allowing kernel mode driver 106B to further evaluate the call for a prohibited change to a critical structure.

For example, kernel mode driver 106B receives a call to a critical function that modifies a registry on host computer system 102, herein termed a critical registry function. The present embodiment is described with reference to a critical registry function that is an operating system function that modifies a registry on host computer system 102, however, those of skill in the art can understand that the present example is not limiting upon the invention and that the present embodiment is applicable to the other critical functions described above, i.e., those critical functions that modify a file, process, or synchronization object on a host computer system. From STALL CALL TO CRITICAL FUNCTION operation 808, processing transitions to a PROHIBITED CHANGE check operation 810.

In PROHIBITED CHANGE check operation 810, kernel mode driver 106B determines whether the call to the critical function includes a prohibited change. In one embodiment, kernel mode driver 106B determines whether the call to the critical function identifies one or more parameters indicative of a prohibited registry change.

In one embodiment, kernel mode driver 106B examines the contents of the call to the critical function and evaluates the contents in accordance with a prohibited change heuristic. In one embodiment, the prohibited change heuristic prohibits calls to critical functions that modify a critical structure, e.g., a registry, a file, a process, or a synchronization object, in a prohibited way, such as in a way that prevents removal of a malicious code from the critical structure.

For example, kernel mode driver 106B examines the contents of the call to the critical registry function and evaluates the contents in accordance with a prohibited change heuristic that identifies a prohibited registry change, such as a change that modifies a selected registry key so that a malicious code file is removed from a listing of files for deletion on reboot and/or a setting associated with the malicious code file in the registry is changed so that the malicious code file is not subject to deletion from host computer system 102. In one embodiment, the prohibited change heuristic is maintained in kernel mode.

In another example, the function name and/or parameters associated with the call to a critical function are compared to a database of prohibited functions and/or prohibited function parameters, herein termed a prohibited change database. When a function name and/or parameter of the call matches a prohibited function name and/or prohibited parameter in the prohibited change database, the call is determined to be a prohibited change, otherwise it is determined not to be a prohibited change. In one embodiment, the prohibited change database is maintained in kernel mode.

When a prohibited registry change is not detected ("NO"), from PROHIBITED CHANGE check operation 810, processing transitions to a RELEASE CALL operation 812.

In RELEASE CALL operation 812, the call to the critical function stalled in operation 806 is released and allowed to complete. In particular, in the present example, when the stalled call does not indicate a prohibited registry change, the call is allowed to complete. From RELEASE CALL operation 812, processing transitions to an EXIT operation 822, with processing exiting method 800, or optionally returning to operation 808 upon receipt of a next call to a critical function.

Referring again to PROHIBITED CHANGE check operation 810, alternatively, when a prohibited is detected ("YES"), the call to the critical function is not allowed to complete as further described herein. In the present example, when the stalled call to the critical registry function indicates a prohibited change, the call is not allowed to complete. From PROHIBITED CHANGE check operation 810, processing transitions to a TERMINATE CALL operation 814.

In TERMINATE CALL operation 814, the stalled call to the critical function is terminated and not allowed to complete. In the present example, the stalled call to the critical registry function is terminated and not allowed to proceed to the critical registry function. In this way the critical structure is not modified in a prohibited manner. In the present example, the registry is not modified to remove the malicious code from deletion from host computer system 102. From TERMINATE CALL operation 814, processing transitions to a GENERATE FALSE SUCCESS operation 816.

In GENERATE FALSE SUCCESS operation 816, kernel mode driver 106B generates a return response that falsely indicates the action in the terminated call to the critical function was successful, herein termed a false success. In some embodiments, kernel mode driver 106B generates return parameters or other data that falsely indicate that the terminated call to the critical function was successful. From GENERATE FALSE SUCCESS operation 816, processing transitions to a RETURN FALSE SUCCESS TO CALLER operation 818.

In RETURN FALSE SUCCESS TO CALLER operation 818, the false success generated in operation 816 is returned to the caller, i.e., the calling process. In this way the calling code, e.g., the malicious code, is not informed that the call to the critical function was unsuccessful, e.g., was terminated. This mitigates retaliatory actions from being implemented by the malicious code in response to termination of the call. From RETURN FALSE SUCCESS TO CALLER operation 818, processing optionally transitions to a NOTIFY operation 820.

In optional NOTIFY operation 820, the user of host computer system 102 (FIG. 1), and/or a system administrator of the network, e.g., network 126, are notified of a malicious code detection on host computer system 102. In one embodiment, a record or error message is generated and provided to the user and/or system administrator. In one embodiment, the notification identifies the particular malicious code and/or any protective action taken.

The user and/or administrator are notified using any one of a number of techniques, e.g., by using a pop up window, by generating an e-mail, by writing to a file and/or otherwise by logging the event. Further, in one embodiment, a notification is provided to a security center. From optional NOTIFY operation 820, processing transitions to EXIT operation 822, or optionally returns to operation 808 on receipt of a next call to a critical function.

In an alternate embodiment, the above method is also applicable to preventing prohibited changes to files, processes, and synchronization objects.

Differently, some malicious code destabilize the operating system when they detect removal or attempted removal, such as by deliberate crashing of the operating system or destabilization by system resource exhaustion. For example some malicious code will crash the EXPLORER.EXE or WINLOGON.EXE processes when the malicious code detects its configuration information is deleted from the registry or a configuration file, causing the machine to reboot. As another example, some malicious codes continuously re-install themselves in the "run" key when they detect removal causing high CPU utilization.

In one embodiment, when a destabilizing malicious code is detected, user mode application 106A requests kernel mode driver 106B isolate the destabilizing malicious code in a virtual environment allowing protective actions to be taken to remove and/or otherwise remediate the destabilizing malicious code as further described herein with reference to FIG. 9 and method 900.

FIG. 9 is a key to FIGS. 9A, 9B, 9C, and 9D that illustrate a flow diagram of a method 900 for isolating destabilizing malicious code in a virtual environment using kernel mode assistance in accordance with one embodiment of the invention. Referring now to FIGS. 1, 2, and 9 together, in one embodiment, execution of malicious code detection and remediation application 106 by processor 108 results in the operations of method 900 as described below.

Figure 9A:
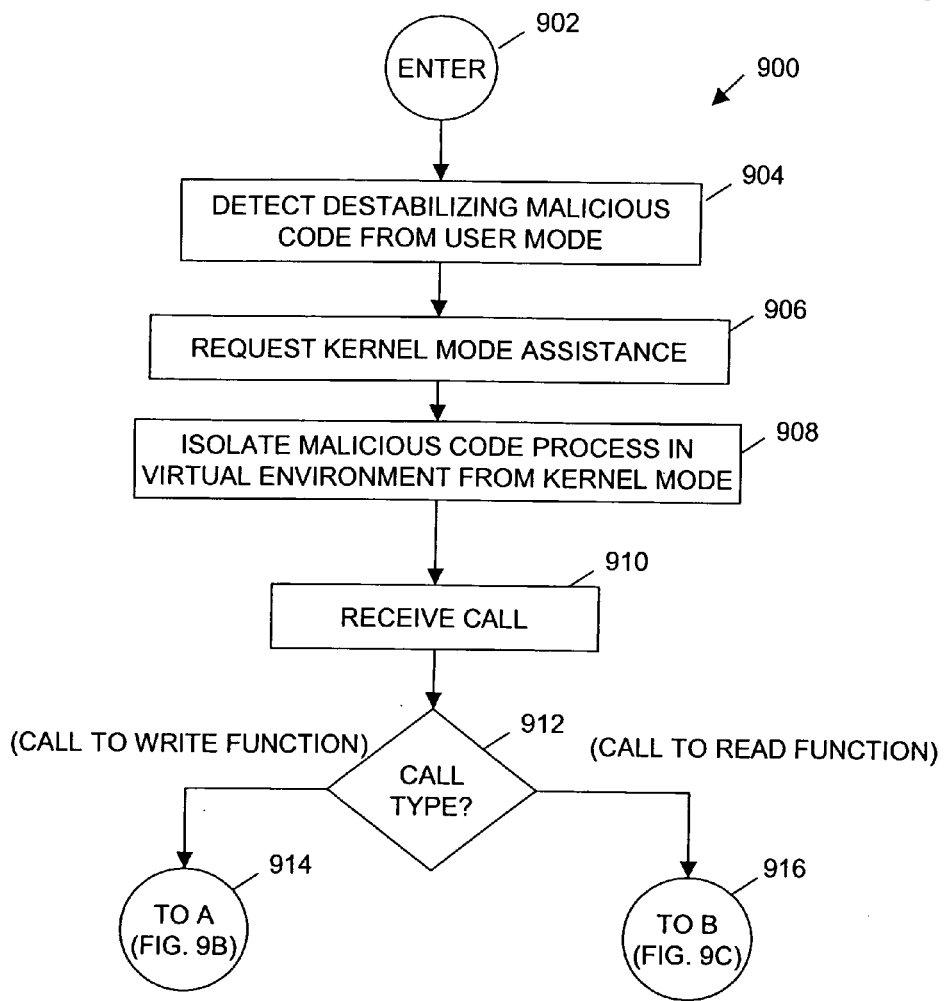
FIG. 9 is a key to FIGS. 9A, 9B, 9C, and 9D that illustrate a flow diagram of a method for isolating destabilizing malicious code in a virtual environment using kernel mode assistance in accordance with one embodiment of the invention.

In the present embodiment, malicious code detection and remediation application 106 is installed on host computer system 102 and includes user mode application 106A that operates from user mode and kernel mode driver 106B that operates from kernel mode. Referring to FIG. 9A, in one embodiment, method 900 is entered at an ENTER operation 902, and from ENTER operation 902, processing transitions to a DETECT DESTABILIZING MALICIOUS CODE FROM USER MODE operation 904.

In DETECT DESTABILIZING MALICIOUS CODE FROM USER MODE operation 904, user mode application 106A detects destabilizing malicious code on host computer system 102. For example, in one embodiment, user mode application 106A detects destabilizing malicious code on host computer system 102, for example, by scanning processes and files on host computer system 102. From DETECT DESTABILIZING MALICIOUS CODE FROM USER MODE operation 904, processing transitions to a REQUEST KERNEL MODE ASSISTANCE operation 906.

In REQUEST KERNEL MODE ASSISTANCE operation 906, in one embodiment, user mode application 106A generates and sends a request to kernel mode driver 106B to assist in subduing the malicious code and preventing it from destabilizing host computer system 102. In one embodiment, user mode application 106A requests kernel mode driver 106B isolate the malicious code in a virtual environment and prevent prohibited changes to file(s) and or the registry by the malicious code.

For example, in one embodiment user mode application 106A communicates the request to kernel mode driver 106B utilizing an input and output control (IOCTL) function, such as DeviceIoControl. IOCTL functions are well known to those of skill in the art and are not further described to avoid detracting from the principles of the invention. From REQUEST KERNEL MODE ASSISTANCE operation 906, processing transitions to an ISOLATE MALICIOUS CODE PROCESS IN VIRTUAL ENVIRONMENT FROM KERNEL MODE operation 908.

In ISOLATE MALICIOUS CODE PROCESS IN VIRTUAL ENVIRONMENT FROM KERNEL MODE operation 908, kernel mode driver 106B isolates the malicious code process detected in operation 904 in a virtual environment, commonly termed sandboxing. Any of a variety of techniques can be used by kernel mode driver 106B to isolate the malicious code process.

For example, in one embodiment, kernel mode driver 106B hooks one or more critical functions on host computer system 102. Herein in one embodiment a critical function is an operating system function that modifies a file or the registry on a host computer system, e.g., host computer system 102, and can allow a malicious code to destabilize the host computer system, e.g., host computer system 102. In one embodiment, a critical function is an operating system function that writes a value to a file or the registry on host computer system 102, herein termed a write function for purposes of this embodiment, or reads a value from a file or the registry on host computer system 102, herein termed a read function for purposes of this embodiment.

In one embodiment, user mode application 106A hooks one or more critical functions in a system call table, such as win32.dll or ntdll.dll. Examples of critical functions hooked in ntdll.dll include those operating system functions callable using NtWriteValue( ), and NtReadValue( ). Hooking of functions in a system call table such as ntdll.dll is well known in the art and can be performed utilizing a variety of hooking techniques.

For example, in one embodiment, a service descriptor table entry associated with the NtWriteValue( ) in a service descriptor table, e.g., the ntdll.dll service descriptor table, is modified so that a call to the associated operating system function, e.g., the NTWriteValue( ) function, is redirected to alternate code, such as a hook module of malicious code detection and remediation application 106. In one embodiment, a function pointer in the service descriptor table entry is modified to point to the hook module rather than the associated operating system function. In one embodiment the hook module is present from kernel mode driver 106B. From ISOLATE MALICIOUS CODE PROCESS IN VIRTUAL ENVIRONMENT FROM KERNEL MODE operation 908, processing transitions to a RECEIVE CALL operation 910.

In RECEIVE CALL operation 910, a call to a hooked critical function is received by kernel mode driver 106B. Herein for purposes of example, a call to a hooked critical function is either a call to a write function or a call to a read function as earlier described with reference to critical functions. From RECEIVE CALL operation 910, processing transitions to a CALL TYPE check operation 912.

In CALL TYPE check operation 912, a determination is made whether the call received in operation 910 is a call to a write function or a call to a read function. In the present embodiment, CALL TYPE check operation 912 is included to provide a clearer description of the present invention. It can be understood by those of skill in the art that the functions of operation 912 can be variously implemented, such as by an event handler or other process for routing calls received by kernel mode driver 106B. When the call is a call to a write function, processing transitions from CALL TYPE check operation 912, at operation 914, to a STALL CALL TO WRITE FUNCTION operation 918 (FIG. 9B).

Figure 9B:
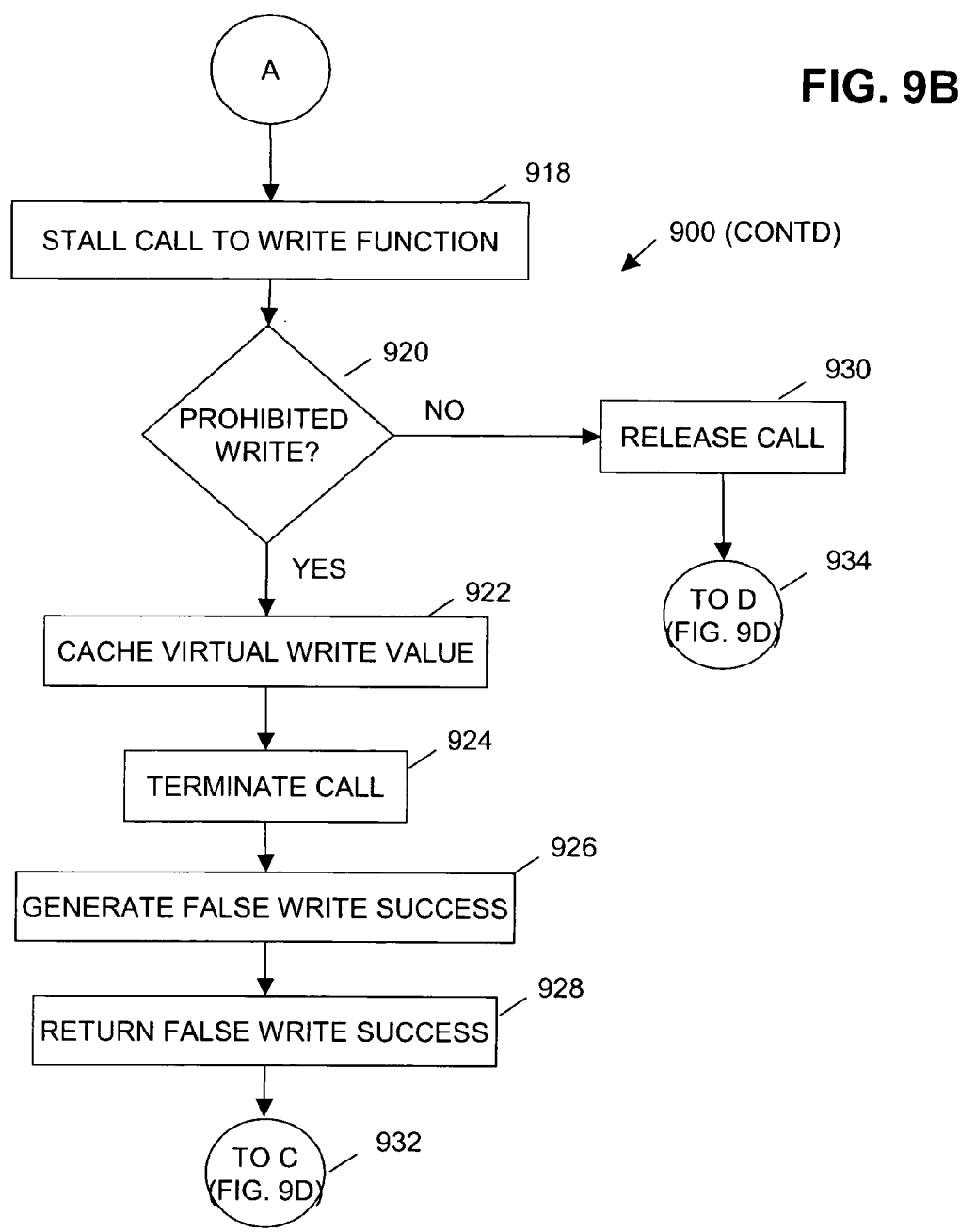

Referring now to FIG. 9B, in STALL CALL TO WRITE FUNCTION operation 918, the call to the write function intercepted in the sandboxing of the destabilizing malicious code process is stalled to allow further evaluation as described herein. In one embodiment, the call to the write function is stalled at kernel mode driver 106B. From STALL CALL TO WRITE FUNCTION operation 918, processing transitions to a PROHIBITED WRITE check operation 920.

In PROHIBITED WRITE check operation 920, kernel mode driver 106B determines whether the stalled call to the write function is a prohibited write. In one embodiment, kernel mode driver 106B determines whether the call to the write function identifies one or more parameters indicative of a prohibited write to a file or registry on host computer system 102. In one embodiment, a prohibited write is an operation that modifies a file, registry, process, or synchronization object on host computer system 102. In one embodiment, a prohibited write is an operation that modifies a file, registry process, or synchronization object on host computer system 102 in a prohibited manner.

For example, in one embodiment, kernel mode driver 106B examines the contents of the call to the critical function and evaluates the contents in accordance with a prohibited write heuristic that identifies prohibited writes. For example, the prohibited write heuristic prohibits writes to the registry of host computer system 102 that could destabilize host computer system 102.

In another example, the function name and/or parameters associated with the call to the critical function are compared to a list of prohibited write functions and/or write functions parameters. When a function name and/or parameter of the call matches a prohibited write function name and/or prohibited write function parameter, the call is determined to be a prohibited write, otherwise it is determined not to be a prohibited write.

When a prohibited write operation is not detected ("NO"), from PROHIBITED WRITE check operation 920, processing transitions to a RELEASE CALL operation 930.

In RELEASE CALL operation 930, the stalled call to the write function is released. More particularly, the call to the write function stalled in operation 918 is released and allowed to proceed to the called function. From RELEASE CALL operation 930, processing transitions, at operation 934, to an EXIT operation 956 (FIG. 9D) with processing exiting method 900, or optionally returns to operation 910 on receipt of a next call to a critical function earlier described.

Referring again to PROHIBITED WRITE check operation 920 (FIG. 9B), alternatively, when a prohibited write operation is detected ("YES"), from PROHIBITED WRITE check operation 920, processing transitions to a CACHE VIRTUAL WRITE VALUE operation 922.

In CACHE VIRTUAL WRITE VALUE operation 922, the virtual address value at which the information would be stored in the target file or registry is determined and cached in a memory location, for example in a sandbox database, in some embodiments the information to be written to the target file or registry, or a pointer to that information, is also stored in the sandbox database. From CACHE VIRTUAL WRITE VALUE operation 922, processing transitions to a TERMINATE CALL operation 924.

In TERMINATE CALL operation 924, the call including the prohibited write is terminated and not allowed to proceed and write to the target file or registry. In this way host computer system 102 is not modified by the destabilizing malicious code. From TERMINATE CALL operation 924, processing transitions to a GENERATE FALSE WRITE SUCCESS operation 926.

In GENERATE FALSE WRITE SUCCESS operation 926, a false success is generated for return to the calling malicious code. In one embodiment, the false success identifies a false virtual address where the write is ostensibly stored. Thus although the prohibited write does not occur, a false write success is generated to make it appear that the prohibited write occurred. From GENERATE FALSE WRITE SUCCESS operation 926, processing transitions to a RETURN FALSE WRITE SUCCESS operation 928.

In RETURN FALSE WRITE SUCCESS operation 928, the false write success generated in operation 926 is returned to the calling malicious code. In this way the calling malicious code receives an expected return of a successful write and is not alerted that the call including the prohibited write was not successful. In this way, retaliatory destabilizing actions are circumvented. From RETURN FALSE WRITE SUCCESS operation 928, processing transitions, at operation 932, to a PERFORM CLEAN UP operation 952 (FIG. 9D).

Figure 9C:
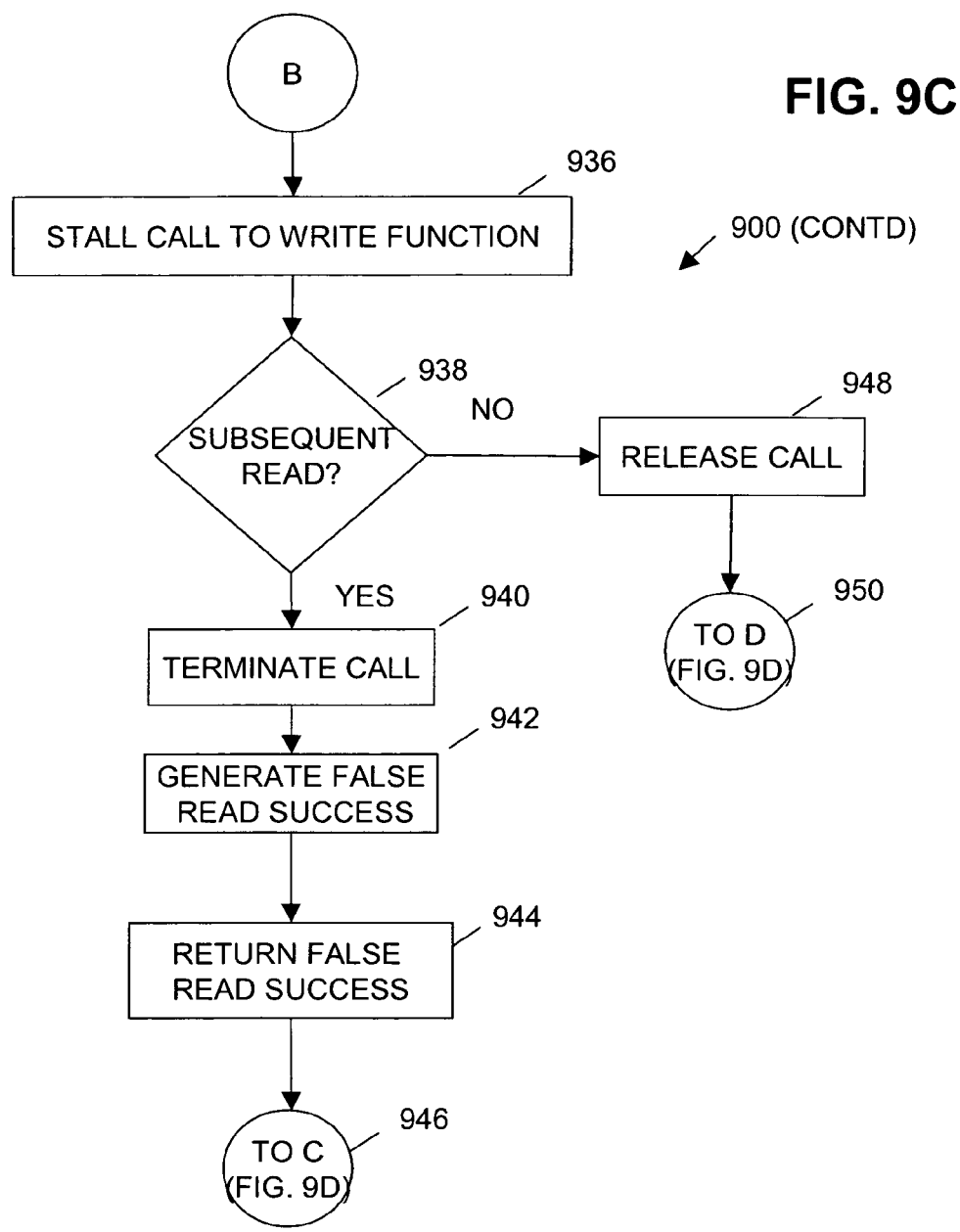
Figure 9D:
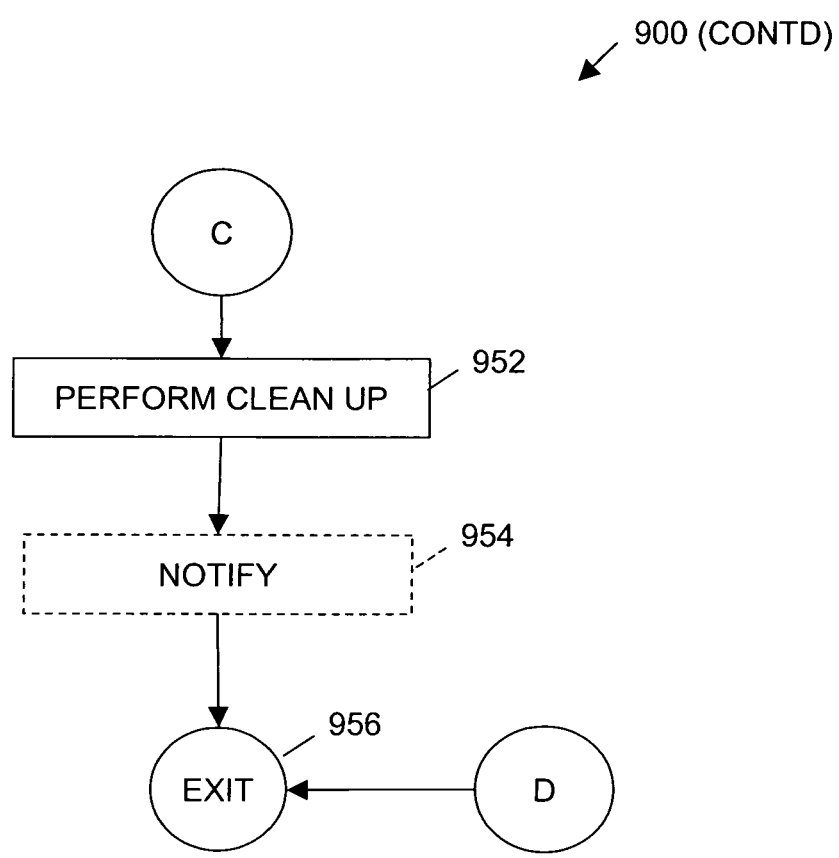

Referring to FIG. 9D, in PERFORM CLEAN UP operation 952, kernel mode driver 106B implements clean up operations as needed. In one embodiment, kernel mode driver 106B deletes files and or registry keys associated with the malicious code or the sandboxing of the malicious code. In one embodiment, kernel mode driver 106B initiates actions to remove the malicious code from host computer system 102. In some embodiments, clean up is performed by user mode application 106A, or both by user mode application 106A and kernel mode driver 106B. From PERFORM CLEAN UP operation 952, processing optionally transitions to a NOTIFY operation 954, or directly to EXIT operation 956, or optionally returns to operation 910 (FIG. 9A) on receipt of a next call to a critical function.

In optional NOTIFY operation 954, the user of host computer system 102 (FIG. 1), and/or a system administrator of the network, e.g., network 126, are notified of a malicious code detection on host computer system 102. In one embodiment, a record or error message is generated and provided to the user and/or system administrator. In one embodiment, the notification identifies the particular malicious code and/or any protective action taken.

The user and/or administrator are notified using any one of a number of techniques, e.g., by using a pop up window, by generating an e-mail, by writing to a file and/or otherwise by logging the event. Further, in one embodiment, a notification is provided to a security center. From optional NOTIFY operation 954, processing transitions to EXIT operation 956, or optionally returns to operation 910 (FIG. 9A) on receipt of a next call to a critical function.

Referring again FIG. 9A and CALL TYPE check operation 912, alternatively, when the call to a critical function is a call to a read function rather than a write function, processing transitions from CALL TYPE check operation 912, at operation 916, to a STALL CALL TO READ FUNCTION operation 936 (FIG. 9C).

Referring now to FIG. 9C, in STALL CALL TO READ FUNCTION operation 936, the call to the read function intercepted in the sandboxing of the destabilizing malicious code process is stalled to allow further evaluation as described herein. In one embodiment, the call to the read function is stalled at kernel mode driver 106B. From STALL CALL TO READ FUNCTION operation 936, processing transitions to a SUBSEQUENT READ check operation 938.

In SUBSEQUENT READ check operation 938, a determination is made whether the call to the read function is a read of information subsequent to an associated write of information. In one embodiment, kernel mode driver 106B determines whether the call to the read function is a call to a location in a file or the registry of host computer system 102 that was ostensibly written to, and a false success returned, in a previous write operation by the malicious code process. In one embodiment, kernel mode driver 106B compares parameters of the call to the read function to determine whether the call is a subsequent read to a prior write. When the call to the read function is a subsequent read ("YES"), the call is assumed to be associated with malicious code, and from SUBSEQUENT READ check operation 938, processing transitions to a TERMINATE CALL operation 940.

In TERMINATE CALL operation 940, the call to the read function, which is a subsequent read, is terminated and not allowed to proceed and read from the target file or registry. As the earlier associated prohibited write was terminated, the values from the prohibited write are not present on host computer system 102 in the location identified in the call to the read function, and false information will need to be returned to the caller. From TERMINATE CALL operation 940, processing transitions to a GENERATE FALSE READ SUCCESS operation 942.

In GENERATE FALSE READ SUCCESS operation 942, a false read success is generated for return to the calling malicious code process. In one embodiment, the last cached write value associated with the location identified in the call to the read function e.g., the cached virtual write value stored in operation 922 (FIG. 9B) in the sandbox database, is obtained and used as a parameter in generating the false read success. From GENERATE FALSE READ SUCCESS operation 942, processing transitions to a RETURN FALSE READ SUCCESS operation 944.

In RETURN FALSE READ SUCCESS operation 944, the last virtual write value cached in operation 922 (FIG. 9B) associated with the location identified in the call to the read function is returned to the caller, e.g., to the calling malicious code in the false read success generated in operation 942. Thus, the calling malicious code receives an expected return of the last cached write value and is not alerted that the call to the read function was not successfully made to the target location. Again, in this way retaliatory destabilizing actions are circumvented. From RETURN FALSE READ SUCCESS operation 944, processing transitions, at operation 946, to operation 952 (FIG. 9D) earlier described.

Referring again to FIG. 9C and SUBSEQUENT READ check operation 938, alternatively, when the call to the read function is not a subsequent read ("NO"), processing transitions to a RELEASE CALL operation 948.

In RELEASE CALL operation 948, the call to the read function stalled in operation 936 is released and allowed to complete. In particular, as the stalled call to the read function does not indicate a subsequent read of a value in a prohibited write, the call to the read function is assumed to not be destabilizing and allowed to complete. From RELEASE CALL operation 948, processing transitions, at operation 950, to EXIT operation 956 (FIG. 9D), with processing exiting method 900, or optionally returns to operation 910 (FIG. 9A) upon receipt of a next call to a critical function.

In some embodiments, SUBSEQUENT READ check operation 938 further includes an evaluation of the calling process. Thus in some embodiments, a calling process that is determined to be a subsequent read, may be excluded from termination, for example, when determined to match an exclusion list.

In an alternative embodiment, rather than user mode application 106A initially detecting malicious code to be sandboxed by kernel mode application 106B, i.e., operation 904, when an application on host computer system 102 performs a write, i.e., calls a write function, kernel mode driver 106B is called, for example by user mode application 106A. Kernel mode component 106B determines whether to allow the write or be sandboxed as earlier described with reference to FIG. 9 and method 900.

Asynchronously, other applications on host computer system 102 can perform read operations, i.e., call read functions. The read operations are evaluated as earlier described in FIG. 9 and method 900 against the database of the sandboxing process. If a match is found, i.e., a subsequent read is determined, the cached value of an associated write, which is cached in the database, is returned.

Although malicious code detection and remediation application 106 is referred to as an application, this is illustrative only. Malicious code detection and remediation application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, malicious code detection and remediation application 106 includes a user mode application 106A and a kernel mode driver 106B.

While embodiments have been described for a client-server configuration, an embodiment may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with the embodiments described herein. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, malicious code detection and remediation application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the functionality of malicious code detection and remediation application 106 in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionality of malicious code detection and remediation application 106 in accordance with one embodiment can be implemented in a wide variety of computer system configurations. In addition, the functionality of malicious code detection and remediation application 106 could be stored as different modules in memories of different devices.

For example, malicious code detection and remediation application 106 could initially be stored in server system 130, and then as necessary, a portion of malicious code detection and remediation application 106 could be transferred to host computer system 102 and executed on host computer system 102. Consequently, part of the functionality of malicious code detection and remediation application 106 would be executed on processor 134 of server system 130, and another part would be executed on processor 108 of host computer system 102. In view of this disclosure, those of skill in the art can implement the various embodiments described herein in a wide-variety of physical hardware configurations using an operating system and computer programming language of interest to the user.

In yet another embodiment, malicious code detection and remediation application 106 is stored in memory 136 of server system 130. Malicious code detection and remediation application 106 is transferred over network 126 to memory 112 in host computer system 102. In this embodiment, network interface 138 and I/O interface 110 would include analog modems, digital modems, or a network interface card. If modems are used, network 126 includes a communications network, and malicious code detection and remediation application 106 is downloaded via the communications network.

This disclosure provides exemplary embodiments. The scope of the various embodiments described herein is not limited by these exemplary embodiments. Numerous variations, whether explicitly provided for by the specification or implied by the specification or not, may be implemented by one of skill in the art in view of this disclosure.

What is claimed is:

1. A computer implemented method comprising:
  executing, on a processor, a malicious code detection and remediation application, wherein said executing includes:
    detecting a locked object by a user mode application, wherein said user mode application is included in said malicious code detection and remediation application, and said user mode application operates from user mode;
    sending a request, from said user mode application to a kernel mode driver, to obtain a handle to said locked object,
      wherein said kernel mode driver is included in said malicious code detection and remediation application,
      wherein said kernel mode driver operates from kernel mode, and
      wherein the sending bypasses the user mode application program interface to the locked object;
    obtaining said handle to said locked object by said kernel mode driver;
    returning said handle to said user mode application;
    accessing said locked object by said user mode application; and
    determining whether malicious code is detected in said locked object; and
    taking protective action upon said determining finding malicious code was detected in said locked object.

2. The computer implemented method of claim 1 further comprising:
  notifying a user of said malicious code detection.

* * * * *